United States Patent [19]

Avery

[11] 4,328,549
[45] May 4, 1982

[54] PROCESS FLOW COMPUTER CONTROL SYSTEM

[75] Inventor: Cecil T. Avery, Louisville, Ky.

[73] Assignee: Olin Corporation, New Haven, Conn.

[21] Appl. No.: 111,457

[22] Filed: Jan. 11, 1980

[51] Int. Cl.³ .................... G06F 15/46; B29D 27/00
[52] U.S. Cl. .................... 364/469; 264/40.7; 264/321; 364/476; 425/145; 521/918
[58] Field of Search ............ 364/476, 468, 469, 118, 364/119, 120, 510, 473, 551, 552, 115, 200 MS File, 900 MS File; 264/321, 41, 46.4, 45.8, 40.1, 40.7, 40.4; 425/145, 135, 136, 162, 169; 521/918

[56] References Cited

U.S. PATENT DOCUMENTS

| | | | |
|---|---|---|---|
| 3,711,687 | 1/1973 | Stout et al. | 364/119 X |
| 3,800,288 | 3/1974 | Russell et al. | 364/200 |
| 3,845,288 | 10/1974 | Cornyn, Jr. et al. | 364/510 X |
| 4,102,958 | 7/1978 | Wertz | 364/476 X |
| 4,118,789 | 10/1978 | Casto et al. | 364/900 |
| 4,126,897 | 11/1978 | Capowski et al. | 364/200 |

*Primary Examiner*—Joseph F. Ruggiero
*Attorney, Agent, or Firm*—William D. Sabo

[57] ABSTRACT

An improved method for automatically controlling the rate of mass flow in a system having a mass mover powered by a power supply which is attenuated by a control device for transferring mass through a conduit, wherein a signal proportional to said mass flow is transmitted to an automatic control unit, characterized by the improvement among others, whereby the improved automatic control unit is provided with a process control mode in which new operating conditions are entered into the program, and the automatic control unit determines the correct mode of control for the new process conditions.

49 Claims, 15 Drawing Figures

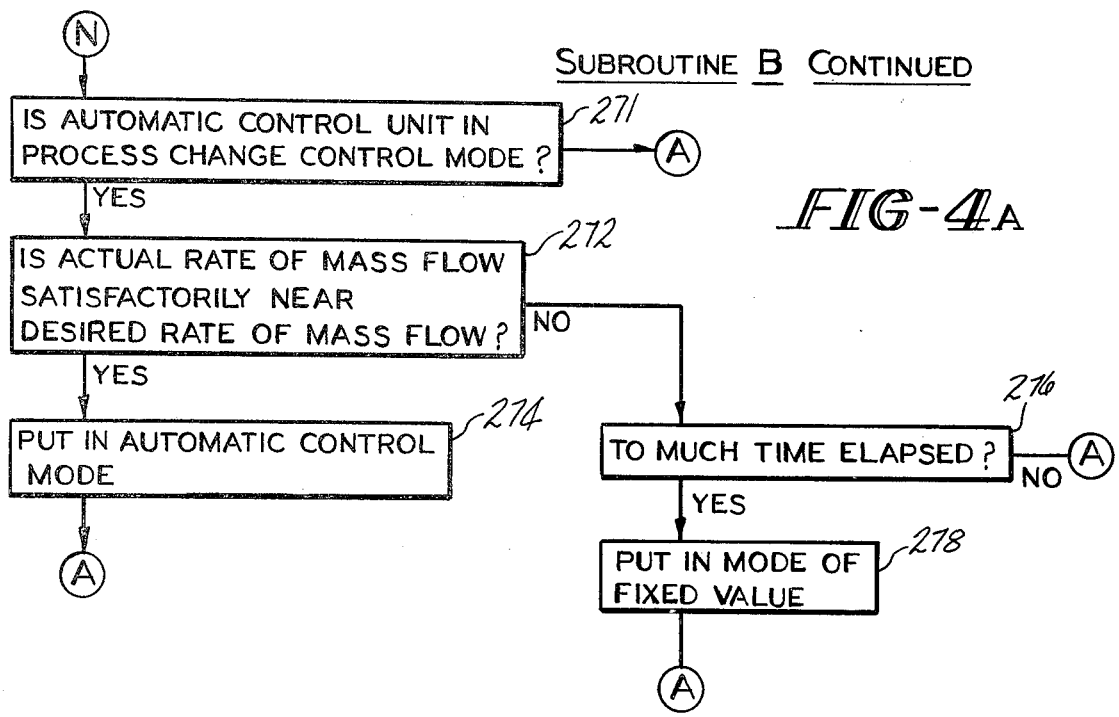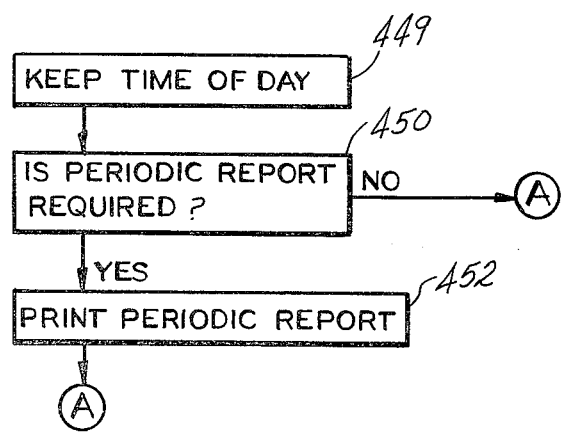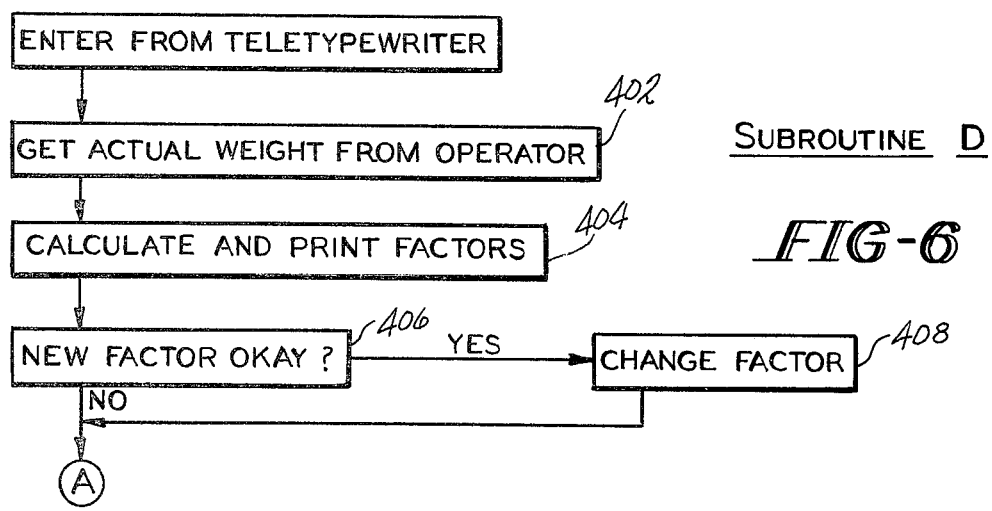

SUBROUTINE E

SUBROUTINE F

SUBROUTINE G

SUBROUTINE H

SUBROUTINE I

PROCESS FLOW COMPUTER CONTROL SYSTEM

The present invention generally relates to an improved method and apparatus for controlling the rate of mass flow in a process system. In particular the present invention relates to a method and apparatus for independently controlling the rate of mass flow of individual component streams in multi-component stream mixing and/or reactive processes, wherein the failure or misaction of one or more of the equipment parts does not thereafter seriously effect the progress of the mixing and/or reactive processes. Typical processes include lubricating oils blending, gasoline blending, and polyol blending. However, a preferred embodiment for which this invention may be suitably employed includes a multi-component stream mixing and reactive processes for the production of a curable polyurethane foam wherein a controlled rate of mass flow and amount of individual components of a plurality of liquid components are admixed during a pour and thereafter reacted to form a partially cured polyurethane foam composition which is thereafter allowed to rise.

Typical curable polyurethane foam compositions and methods of cure therefore are described in U.S. Pat. Nos. 3,506,600 and 3,709,843, issued to Natalie C. Zocco on Apr. 14, 1970, and Jan. 19, 1973, respectively; and U.S. Pat. Nos. 3,577,519 and 3,709,966, issued to Mario A. Gambardella on May 14, 1971, and Jan. 9, 1973, respectively. The disclosures of these patents are incorporated herein by reference in their entirety.

The earliest and simplest low-pressure system introduced in the United States to continuously prepare polyurethane foam was comprised of gear pumps and pressure gauges. The theory was that if the pumps had the correct operational setting on them, and if the pressure gauges on downstream lines showed the same and proper setting, as during pre-pour setup and measurement periods, no pumping failure could go udetected during pour. In theory, this was fine, but there were still problems in practice since it was impractical to have manpower dedicated to observing each of several pressure gauges 100 percent of the time before and during a pour. Yet a process or pump failure of about two minutes might wipe out a day's profits particularly in an industry which had always been very competitive due to overcapacity. Also pressure gauges did not respond to instantaneous fluctuations, their reliability was not as high as desired, and pressure fluctuations occurred due to variable mixing head back-pressure (from discharge screens or cloth becoming partially clogged) which had nothing to do with metering problems.

Digital type control modules were later employed whereby on these same streams, a downstream flow meter would send an accurate and reproducible signal of the actual process rate of mass flow back to the control module. If the actual rate of mass flow did not agree with the desired rate of mass flow, a pump speed was immediately increased (or decreased), or a bypass valve opened more (or closed more). This digital type control logic may work fine on small scale operations such as in research laboratories where electronic or mechanical failure does not constitute a financial loss since the test buns poured are of small amounts and are of experimental use only.

In full scale industrial production, process throughputs are in the range from about 10 to about 1,000 pounds per second or greater. This production rate amounts to a value in the range from about $20 to about $20,000 worth or greater of process components per second. Failure of the control unit for about a second or two can immediately cause about several hundreds of dollars worth of off spec foam product generally scrap.

In actual production, a failure of the signal from the flow meter can occur due to defective parts. Even if all parts worked fine, a decrease in the plant line supply voltage can occur. Any or all of these and other failures can cause a decrease in supply voltage output to feed the rate of mass flow monitor equipment. This in turn can fail to produce the required DC output signal needed as a feedback signal to digital type control module.

Some flow meters require preamplifiers or up-stream electric current to air pressure tranducers; and, while these are more reliable than some of the other electronic systems, they are not yet completely free of mechanical or electrical problems.

Other problems which typically plague present control systems include mechanical part failures such as jammed rotors, broken gears, or broken shafts on pumps. Additional problems include inadvertent opening of bypass valve piping around flow meters which causes the flow signal to change but does not change the actual flow. These and other problems typically result in control misaction on the part of the digital type control module.

OBJECTS

It is a principal object of the process of this invention to provide an improved automatic control unit for providing multimode control of individual process flow systems in a multi-component stream mixing and/or reactive processes.

It is an additional object of this invention to provide an improved automatic control unit wherein tracking circuitry is employed for detecting possible malfunctions within the process and for changing the operating mode when these malfunctions occur.

It is a further additional object of this invention to provide an improved automatic control unit whereby operative commands to the automatic control unit may be entered by means of a single key of a multi-key terminal.

It is a further object of this invention to provide an improved automatic control unit whereby the control signal from the automatic control unit to the process is maintained in a mode of fixed value when the difference between the actual rate of mass flow and a standard rate of mass flow exceeds a predetermined range and thereafter applying appropriate logic to confirm said difference.

It is yet a further object of this invention to provide an improved automatic control unit whereby the control signal from the automatic control unit to the process is maintained in a mode of fixed value upon equipment failure of a portion of the automatic control system.

It is still a further object of this invention to provide an improved automatic control unit whereby the control signal from the automatic control unit to the process is maintained in a mode of fixed value upon power failure to a portion of the automatic control system.

It is yet an additional object of this invention to provide an improved automatic control unit whereby the control signal from the automatic control unit to the process is maintained in a mode of fixed value upon failure of the process monitor device to supply a correct signal to the automatic control unit.

It is another object of this invention to provide an improved automatic control unit which can directly detect process failure, and take corrective action by switching to a more appropriate control mode.

Still another object of this invention is to provide an improved automatic control unit which is provided with a process control mode in which new operating conditions are entered into the program, and the automatic control unit determines the correct mode of control for the new process conditions.

It is yet another object of this invention to provide an improved automatic control unit whereby only preselected and sequentially allowable operative commands may be entered to the automatic control unit.

BRIEF DESCRIPTION OF THE INVENTION

The foregoing and other objects are achieved in an improved method for automatically controlling the rate of mass flow in a system having a mass mover powered by a power supply which is attenuated by a control device for transferring mass through a conduit, wherein a signal proportional to said mass flow is transmitted to an automatic control unit, characterized by the improvement which comprises, in combination:

(a) entering in said automatic control unit a standard signal, $S_a$, representative of a desired rate of mass flow in said conduit, (b) entering in said automatic control unit a rate of mass flow deviation range, $K_1-K_2$, (c) entering in said automatic control unit an initial operating voltage, V, and transferring a signal proportional to said V to said control device to operate said mass mover while in automatic control mode to attenuate said power supply to said mass mover, and to produce a rate of mass flow in said conduit at said initial operating voltage, V, (d) obtaining a first signal, $S_1$, proportional to the actual rate of mass flow in said conduit, and conveying said first signal, $S_1$, to said automatic control unit, (e) comparing said $S_a$ with said $S_1$ in said automatic control unit and calculating a difference, D, between said $S_a$ and said $S_1$, and comparing said difference, D, with said mass flow deviation range, $K_1-K_2$, (f) when said difference, D, exceeds said mass flow deviation range, $K_1-K_2$, switching said automatic control unit to a mode of fixed value, and thereafter transmitting a signal proportional to said initial operating voltage, V, to said control device to operate said mass mover at a fixed signal value.

DETAILED DESCRIPTION OF THE DRAWINGS

Figure 1:
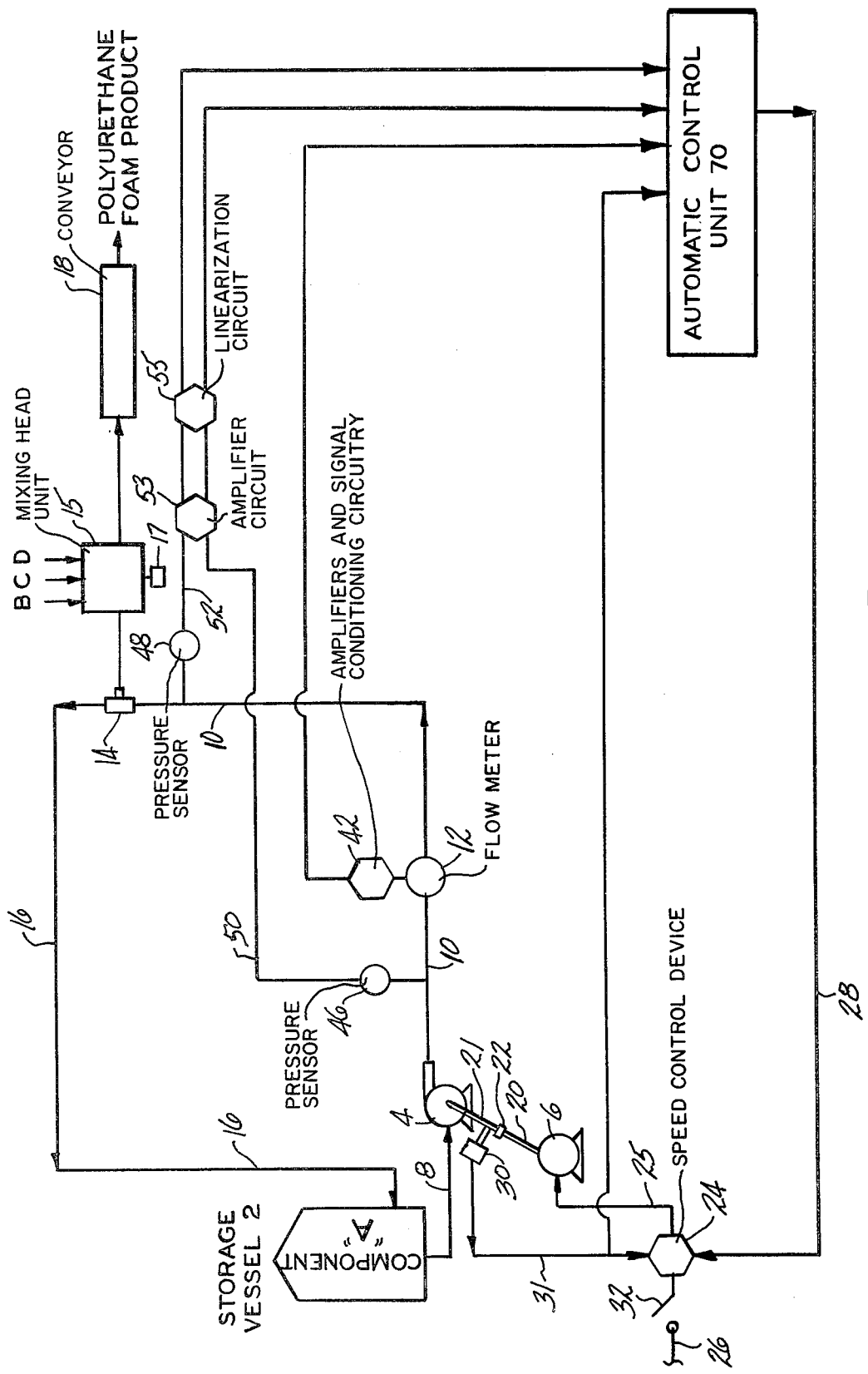
Figure 2:
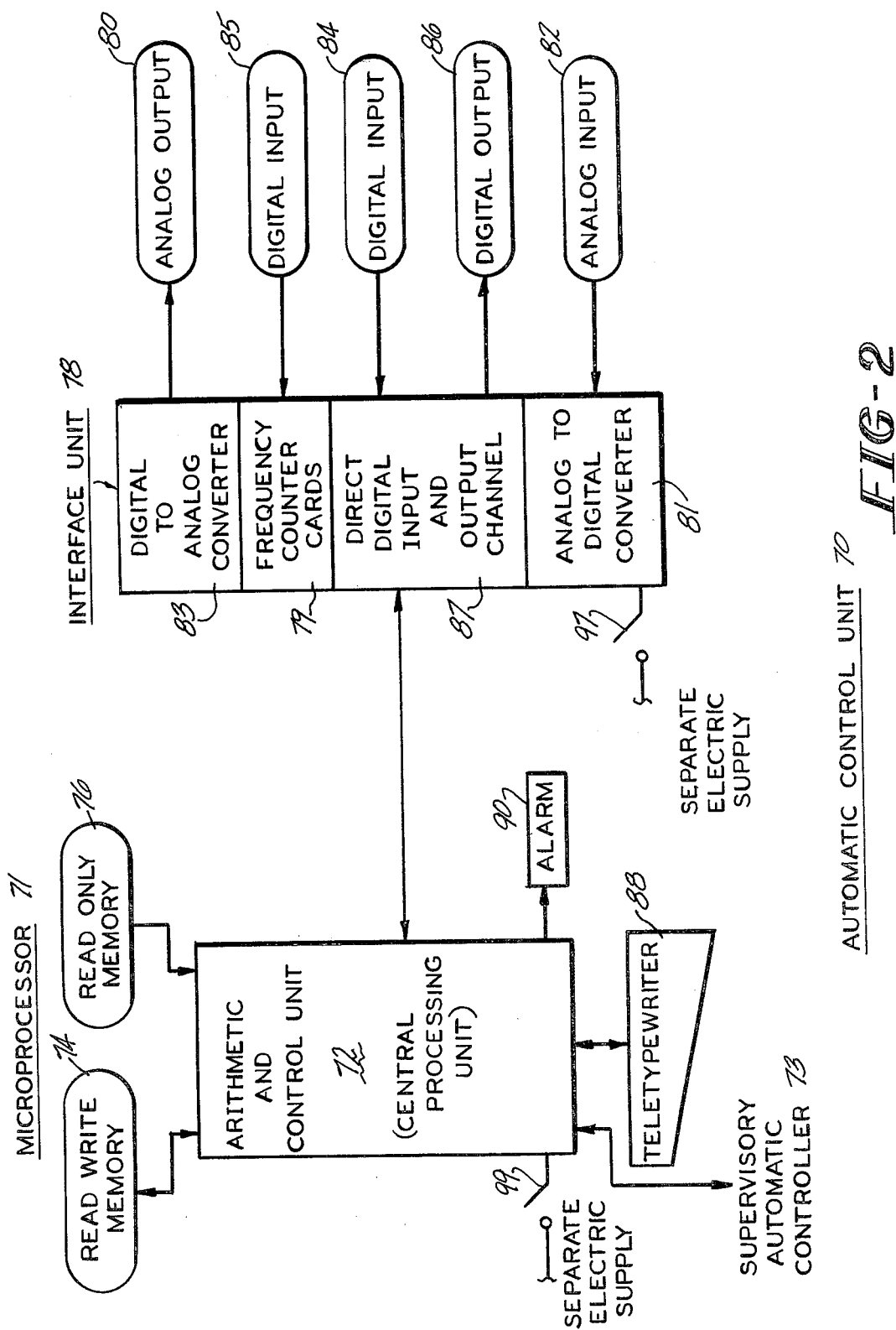
Figure 3:
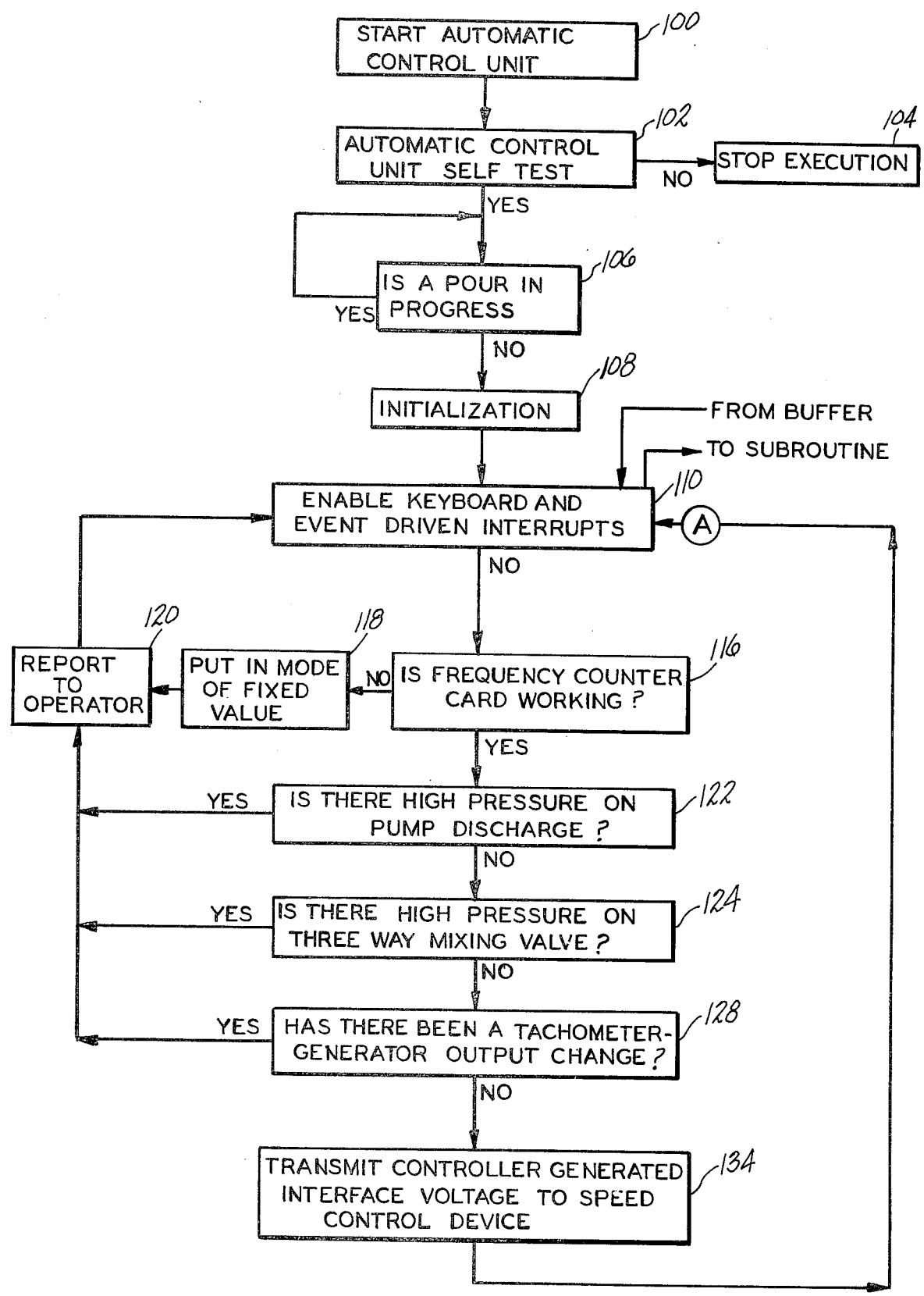
Figure 4:
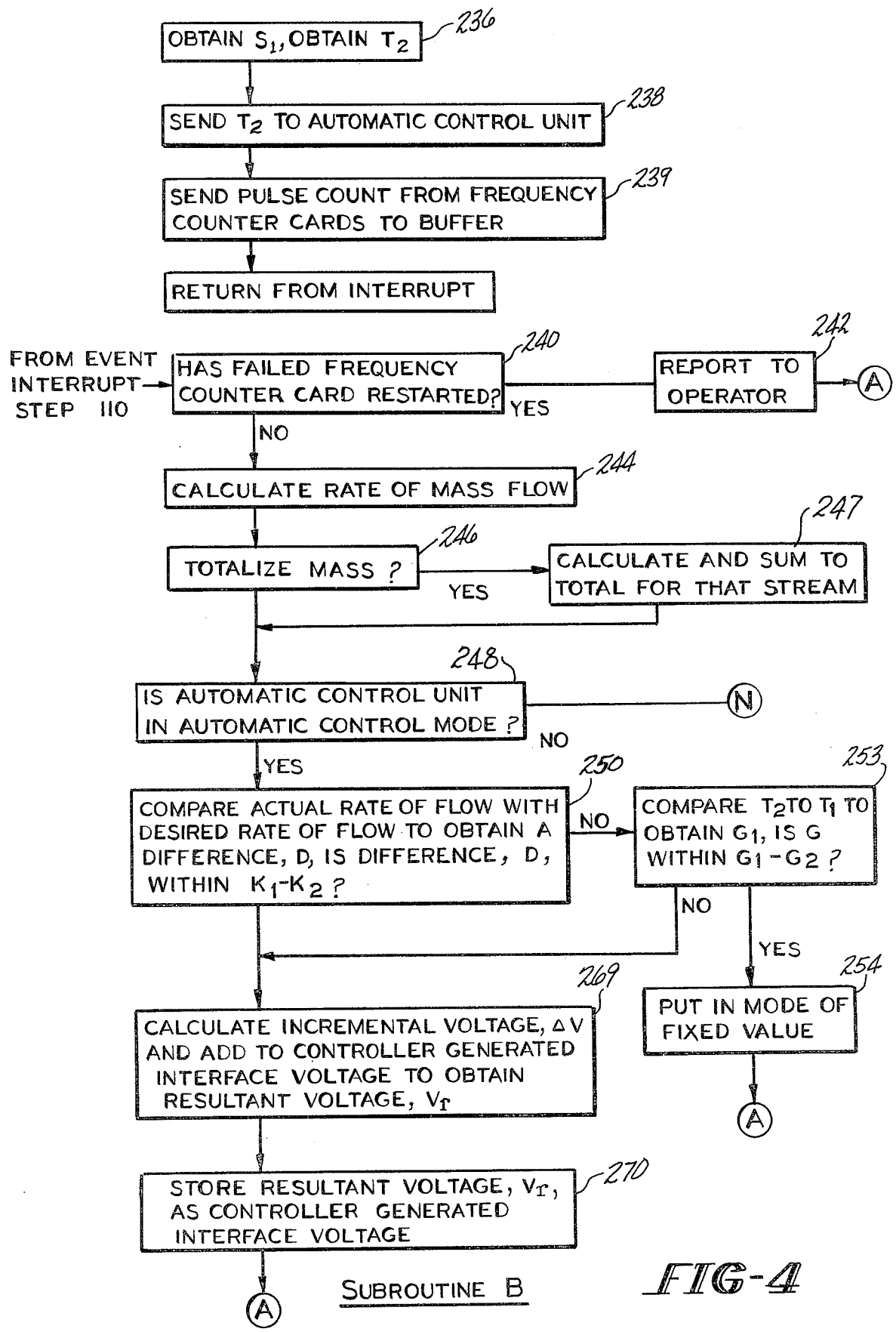

For a better understanding of the principles and function of the invention, the same will now be described by way of illustrative example with reference to drawings in which:

FIG. 1 is a schematic block diagram of a preferred industrial flow process controlled in accordance with the present invention, FIG. 2 shows the main features of a preferred embodiment of a control unit, and FIGS. 3-4 show flow diagrams of the illustrative computer programs utilized to carry out the process of this invention.

DETAILED DESCRIPTION OF THE INVENTION

The term "mass" is employed in the description and claims to include any organic material, inorganic material, or mixtures thereof.

The term "mass mover" is employed throughout the description and claims to include any device which directly or indirectly promotes, enhances, discourages, or encourages the flow, transport, or movement of mass through or in a conduit. Examples of mass mover includes pumps, flow control valves, pressure control valves, pressure regulators, variable opening orifices, and the like.

The term "conduit" is employed throughout the description and claims to include any device which transports, houses, contains, directs, or diverts mass. The conduit may be totally enclosed, partially open, or perforated. Examples of conduit include pipe, headers, canals, tubing, process lines, and the like.

The term "automatic control unit" is employed throughout the description and claims to include minicomputers, microcomputers, microprocessors, digital computers, transistor circuitry, vacuum tube circuitry, analog circuits, and the like.

The term "control device" is employed throughout the description and claims to include motor speed control devices, valve positioners and actuators, and the like.

The term "power supply" is employed throughout the description and claims to include AC and DC electricity power, vacuum, pressure (pneumatic power), and the like.

The term "signal" is employed throughout the description and claims to include electrical signals, pressure signals, and the like.

The term "voltage" is employed throughout the description and claims to include a potential, for example, electrical potential and pressure potential. Preferably, an electric power source is desired.

Attached FIG. 1 illustrates a typical process flow system and automatic control unit for one typical component "A" of a curable polyurethane foam composition, wherein component "A" is employed as the mass, pump 4 is employed as the mass mover, and process lines 8 and 16 are employed as conduits and a speed control device 24 is employed as a control device. The process flow system and automatic control unit are illustrated for component "A" only for purposes of simplification. However, in practice, any number of such process flow systems may be successfully independently controlled by the process of this invention.

Those of skill in the art will recognize that component "A" may itself be a multi-component stream. Component "A" may be in any physical form such as fluid, liquid, particulate solid, vapor, or mixtures thereof. Variations of this process flow scheme may be employed without departing from the spirit of this invention.

One or more mass movers may be employed, if desired. In the preferred embodiment, use of one mass mover is desired.

Typically, component "A" is generally stored in liquid form in a suitable storage vessel 2 as shown in FIG. 1. Component "A" includes but is not necessarily limited to typical components of curable polyurethane foam compositions such as polyol, blowing agents, chain extending agents, water, catalyst, lubricant, organic isocyanate, and mixtures thereof. Typically, component "A" is removed from storage vessel 2 by pump 4 (driven by electric motor 6) which takes suction on storage vessel 2 via process line 8. Pump 4 transfers component "A" through discharge process line 10 through a pulse generating flow meter 12. Component "A" is discharged from discharge process line 10 through a three-way mixing head valve 14 where during a pour, component "A" flows to mixing head unit 15 where component "A" is admixed with and reacted with other components, B, C, D, and the like to form a curable polyurethane foam composition. Thereafter, the curable polyurethane foam composition is fed to coated paper moving on conveyer 18. Within minutes, the curable polyurethane foam composition expands in the range from about 1 to about 100 times, gels and partially solidifies. In a particular application, a compressive force (not shown) is thereafter applied to the partially cured polyurethane foam composition on conveyer 18 to reduce its volume by a desired percentage. After removal of the compressive force, the partially cured polyurethane foam composition is discharged from conveyer 18 as a cured polyurethane foam product in a large foam loaf about 2 foot to about 12 foot wide, and about 2 inches to about 75 inches high. The cured polyurethane foam product is then cut into blocks (not shown) continuously by a moving horizontal band saw (not shown).

Mixing head unit 15 can have in the range from about 1 to about 10,000, and preferably about 2 to about 12, component streams in addition to component "A" entering it simultaneously. In a preferred application, mixing head unit 15 is comprised of at least one rapidly rotating propeller (not shown) within a mixing zone. The power to rotate the propeller (not shown) is supplied by an electric motor 17. The propeller speed is in the range from about 1,000 to about 20,000 rpm. This high speed is necessary since the residence time of the curable polyurethane foam composition in the mixing head unit 15 is in the range from about 0.1 to about 10 seconds. Any failure to obtain proper metering or mixing during formation of the curable polyurethane foam composition will produce costly off-ratio cured polyurethane foam product which is generally scrap.

When the components are not being mixed together to form a curable polyurethane foam composition, then three-way mixing head valve 14 is closed and component "A" is transferred through process line 16 back to storage tank 2. The position of three-way mixing head valve 14 is changed by energizing or de-energizing an electrical solenoid (not shown) attached to three-way mixing head valve 14.

Typical pumps which may be employed as pump 4 of the process flow system depicted in FIG. 1 include positive displacement pumps such as gear pumps whose volumetric output is proportional to the angular or rotational speed of the pump. Other type pumps which may also be employed as pumps include centrifugal and vacuum pumps.

FIG. 1 also depicts the electrical circuitry employed to supply electrical power to the electric motor 6 which drives pump 4. Typically, a direct current electric motor 6 has its output shaft 20 directly connected to the rotor shaft 21 of pump 4 by coupling 22.

An input electrical signal control voltage 28 is supplied to speed control device 24 from automatic control unit 70 and is termed the "controller generated interface voltage". The main electric supply 26 has a switch 32 for turning the main electric supply 26 on or off.

A tachometer-generator 30 is mounted on the rotor shaft 21 of pump 4 and provides a voltage signal 31 proportional to the angular (rotational) speed of pump 4. Speed control device 24 receives as input signals, the controller generated interface voltage signal 28, the tachometer-generator voltage signal 31, if desired, and the main electric supply 26. Speed control device 24 generates an output signal 25 to electric motor 6 in response to the aforementioned input signals. A typical speed control device 24 is disclosed for direct current operated electric motor 6 in U.S. Pat. No. 3,250,901, issued to Charles B. Brahm on May 10, 1966. The disclosure of that patent is incorporated herein in its entirety by reference.

Although it is preferred to employ direct current as a main power supply, alternating current may be employed as the pump electric power supply 26. However, a different type of speed control device (not shown) is then required to control the speed of pump 4.

Metering devices employed in process flow systems in FIG. 1 include pulse generating flow meter 12, which is preferably a positive displacement meter equipped with pulse generating devices which produce discrete electrical pulses, the number of such pulses being proportional to the volume of material being transferred through the meter and which are reproducible for a wide range of volumetric rates of mass flow. These positive displacement meters usually operate by the process fluid rotating a device mechanism which in turn rotates a magnetized element through or near a coil to produce an electrical pulse. A discrete pulse of energy is generated each time a discrete quantity of fluid flows through the flow meter. Preferred types of positive displacement meters include turbine meters having propellers for handling low viscosity fluids, that is, fluids having a viscosity of less than about 100 centipoises at room temperature; gear meters such as oval gear meters, or bi-rotor gear meters which rotate in a chamber for handling high viscosity fluids, that is, fluids having a viscosity greater than about 100 centipoises at room temperature; and gang of piston-type meters. Other permissible flow meters include orifice meters, vortex shedding, magnetic, and mass flow meters.

The output of the pulse generating flow meter 12 is connected to amplifiers and signal conditioning circuitry 42 employed to (1) amplify or increase the power of the output signal from the pulse generating flow meter 12 from a relatively low power millivolt signal to a relatively high power volt signal and (2) to convert the output voltage to a square wave form for use in frequency counter cards (not shown). In frequency counter cards, the pulses are counted or summed over a predetermined time interval to obtain pulse counts. Conversion of the pulse count to a rate of mass flow is accomplished in automatic control unit 70 by multiplying the pulse count by an appropriate conversion factor to determine the rate of mass flow. Automatic control unit 70 determines whether to increase or decrease the controller generated interface voltage 28 to increase or decrease the corresponding rate of mass flow.

A pressure sensor 46 such as a pressure gauge is positioned on the discharge process line 10 of pump 4 to sense and indicate the discharge process pressure of pump 4 in discharge process line 10. Similarly, another pressure sensor 48 such as a pressure gauge or strain gauge is positioned on discharge process line 10 near the discharge point of discharge process line 10 into three-way mixing head valve 14 to indicate the process pressure within discharge process line 10 at that point.

Pressure sensors 46 and 48 are typically pressure gauges. However, strain gauges (not shown) may also be suitably employed as pressure sensors 46 and 48. Typically, such strain gauges (not shown) have a piezoelectro element (not shown) which produces a variable resistance proportional to the amount of physical force exerted on the strain gauge. The pneumatic outputs 50 and 52, respectively, from pressure sensors 46 and 48 are typically converted to an analog voltage to a pneumatic to electric transducer (not shown) and are thereafter fed to an amplifier circuit 53 and a signal conditioning and linearization circuit 55.

The amplifier circuit 53 acts to increase the voltage of the input circuit proportionally while the linearization circuit 55 converts all non-linear characterization voltage signals to linear voltage signals. For example, the output voltage signal from the pressure sensing devices 46 and 48 may be of logarithmic, parabolic, or exponential characterization. The linearization circuit 55 converts this non-linear voltage signal to a linear voltage signal whenever strain gauges are employed as pressure sensors 46 and 48.

The present invention is efficiently implemented with an automatic control system. One approach is the use of select logic chips or modules interconnected to perform the desired function. The preferred approach described herein employs a programmed computer. The description that follows sets forth functions that are performed by components of the computer in the operation of the system according to the invention. For a particular function to be performed, the computer is programmed to step through a sequence of instructions that command the desired function. In some instances, the statement of the function is practically to simplify a sequence of instructions, for example, as to values that are to be compared. This is accomplished by a code check sequence by (1) loading a register with the contents of a memory location containing one of the numbers and (2) comparing the number in the register with the contents of a memory location containing the other number. In other cases, more instructions may be required but the intent hereafter will be to detail a program providing a described function in the context of conventional computer processes.

Automatic control unit 70 of FIG. 2 is comprised of a microprocessor 71 and an interface unit 78. Microprocessor 71 is comprised of an arithmetic and control unit 72, a read-write memory 74, and a read only memory 76. Automatic control unit 70 receives inputs of process measurements and controls and produces appropriate outputs. Typical process measurement inputs include process physical variable changes such as rate of mass flow changes which may be either analog or digital. Typical control inputs include data reflecting decisions made by a human or by a supervisory automatic controller 73. Data from both are typically entered in binary form. Typical outputs include information in the form of data or commands that result from input data and that relate to the overall objectives of the invention. Examples in FIG. 1 of process measurement input data include signals proportional to pressure sensor 48 at three-way mixing head valve 14, signals from amplifier 42, and signal 31 proportional to the output of tachometer-generator 30. These process measurement signals are fed through an interface unit 78 in FIG. 2 and then to arithmetic and control unit 72. The voltage signals from the process variable such as pressure and temperature sensors will typically be analog in nature, e.g., the voltage is proportional to the value of the sensed variable.

Those of skill in the art will recognize that read-write memory may be employed to store values for process variables and calculated variables during the employment of the process of this invention.

Read-write memory 74 (also known in the art as random access memory) and read only memory 76 are two typical types of microcomputer memory. Typical characteristics thereof are described in *Popular Electronics,* "Computer Bit", March, 1978, Volume 13, No. 13, pages 96–97 and in *Chemical Engineering,* "Microprocessor Basic Concepts, Highly Complex Computer-on-a Chip Simplifies Processing Operations", Mid-April, 1979, pages 10–13. The disclosures of those articles are incorporated herein in their entirety by reference.

Read-write memory 74 stores binary bytes as electrical charges in transistor memory cells. Read-write memory 74 can be read and modified (written) programmatically by the arithmetic and processing unit 72. In the program hereafter described, the read-write memory 74 stores values for variables employed in the program calculations and input operator instructions. Typical stored variables include standard signals, $S_a$ and $S_b$, representative of desired rates of mass flow, real time, $t_o$, signals, $S_1$, $S_2$, $S_3$, and $S_4$ proportional to actual rate of mass flow, and the like. The read-write memory 74 is usually altered when the main power supply switch 99 is turned off. Other information stored in the read-write memory 74 include meter factors, and all numbers which may be changed.

During the program execution, read-write memory 74 registers are employed to store the values of all the instantaneous control system output commands in particular the controller generated interface voltage.

The read only memory 76 stores the program instructions which are typically permanent, e.g., non-volatile, which are manufactured into the read only memory 76 and which are not readily changeable thereafter. The read only memory can be addressed programmatically by the arithmetic and control unit 72. However, information can only be extracted from the read only memory 76. This information is typically instructions such as the logic program which is described more particularly hereafter and is stored in digital form. At microscopic points in the read only memory 76 circuits, the current is either on or off. This read only memory 76 is only erasable with intense ultraviolet light. Typical read only memory 76 contains up to about 16,000 bits of data to serve as the arithmetic and control unit 72 basic instructions. The read only memory 76 is a set of precise logic instructions that tells the arithmetic and control unit 72 how to respond to input responses such as pulse counts from frequency counter cards 79. The read only memory 76 has been developed from a logic chart of the type shown in FIG. 3, which is a schematic representation of the program logic. The logic chart is developed first into a source program employing computer program language such as FORTRAN, COBOL, or preferably BASIC language. As assembly program is then prepared from a source program. The assembly language is a translation of the programming language into machine language. The machine language is then converted into an object program which is a device commanding a series of electrical pulses. The resulting object program is stored in apparatus form as the read only memory 76.

The source program for this system is written in a relatively high language, BASIC. Normally, BASIC language is too slow for a control application such as their preferred embodiment, especially where asynchronous events are expected. This application was made to work by using the program interrupt feature of the computer and by using a program which buffers event interrupt data and the time it occurred so that it could be serviced in sequence even as additional event and keyboard are saved (if valid) in a separate buffer so that these can be serviced at a lower priority than interface equipment interrupts. Outputs do not cause interrupts and are not buffered.

Buffer systems (not shown) are well known in the art and typically comprise an array of memory or registers or read-write memory 74. A preferred buffer system comprises a double buffer where separate buffers are employed for keyboard interrupts and event driven interrupts. Two buffers can be employed to speed up the processing by allowing a direct memory access or event interrupts to proceed from one buffer while the program is processing data and filling in the other buffer. This type of buffering is accomplished in a ring buffer well known in the art. Various types of double buffers are disclosed in "How to Program Microcomputers", Howard W. Sams & Co., 1977, by William Barden, Jr., in particular pages 164–172. The teachings of that reference is incorporated herein by reference.

The program of the present invention incorporates a means of categorizing interrupts so that priorities can be assigned to them.

Interrupts comprise keyboard interrupts and event interrupts. Typical event interrupts include on/off switch, pulse count data from frequency counter cards 79, equipment failure, power failure, and the like. Typical keyboard interrupts include operative command input by an operator, clock adjustment timer, calibration run results, change of desired rate of mass flow, and the like.

Event interrupts are assigned a priority higher than the priority assigned to keyboard interrupts. In turn, keyboard interrupts are assigned a higher priority than the priority assigned to main monitor loop, steps 110–134 of FIG. 3 and accordingly are given access to the automatic control unit 70 any time an event interrupt occurs or as soon as possible thereafter. Event interrupt data such as data from pulse frequency counter cards 79, and equipment failure and power failure, and the real time it occurs is stored in a buffer previously described so that it can be serviced in sequence even as additional interrupts are occurring. Valid keyboard interrupts are saved in a separate buffer storage so that these can be serviced at a lower priority than event interrupts.

A pointer system is typically employed in buffer systems to continuously scan for interrupts waiting to be serviced. Upon locating an interrupt awaiting service in the buffer, the program transmits the interrupt to the appropriate subroutines hereafter described for servicing.

In order for the automatic control unit 70 to communicate with the system being controlled, it must be connected to devices which can translate operations into signals automatic control unit 70 can understand and devices which translate signals from automatic control unit 70 into operations for the process components.

Interface unit 78 provides means for transferring digital output data into the arithmetic and control unit 72. Typically, digital input data includes rate of mass flow, whether a switch is on or off or whether a valve is closed or open.

The interface unit 78 provides a capability of transferring digital output in the form of commands from arithmetic and control unit 72, for example, to adjust the voltage supply to speed control device 24, to turn on or turn off electrial circuits such as relays or transistors or, for example, audible alarm systems.

The interface unit 78 is designed to be functional even if the arithmetic and control unit 72 stops running, malfunctions, or becomes electrically disconnected. The interface unit 78 is connected to a separate electrical power source 97 so that it can remain electrically active even if the arithmetic and control unit 72 is shut off electrically. Should a power failure occur to arithmetic and control unit 72, the interface unit 78 maintains the output voltages to the speed control device 24 as the controller generated interface voltage in storage.

In order to effect an output signal from interface unit 78, the arithmetic and control unit 72 must properly address a valid output module channel in the interface unit 78 and then issue a valid instruction to that module. This sequence is unlikely to occur with a malfunctioning arithmetic and control unit 72. Without a valid change instruction, the outputs from interface unit 78 to speed control device 24 will not change from the last controller generated interface voltage. The rates of mass flow should remain relatively steady even without arithmetic and control unit 72 operation.

The arithmetic and control unit 72 also receives the output of the frequency counter cards 79 based upon digital input 85. The output command signal from the arithmetic and control unit 72 is addressed to specific output module channels in the interface unit 78, such as converter 83 or channel 87, and then transmitted by the interface unit 78 to the speed control device 24 such as the controller generated interface voltage. The controller generated interface voltage may be a fixed voltage, e.g., invariant with the actual rate of mass flow as in a mode of fixed value, or may be variant and reflect the output of the arithmetic and control unit 72 which is controlling the rate of mass flow in an automatic control mode or process change control mode as described more fully hereafter.

Analog input system 82 is comprised of several components. For example, the value of the proces variable, such as temperature, pressure, or rate of mass flow, is transformed by a transducer (not shown) into an electrical signal. Since measurements of process variables are usually in analog form, that is, the voltage generated is proportional to the temperature, pressure, or rate of mass flow, and since the arithmetic and control unit 72 can process data only in digital (binary) form, the analog input data must be converted into binary digits or bits (0's, 1's). Such analog to digital conversion is accomplished within interface unit 78 by employing an analog to digital converter 81.

Typical analog to digital converters 81 which may be employed in interface unit 78 as apparatus in the process of this invention include analog to digital converters 81 having binary digital computer control feedback means as described in U.S. Pat. No. 3,882,488, issued to Henry R. Kosakowski et al on May 6, 1975. The disclosure of that patent is incorporated herein in its entirety by reference. Another method of analog to digital conversion is described in *Scientific American*, "Automatic Control by Distributed Intelligence", pages 78-90, June, 1979, in particular page 81, whereby a feedback loop is employed so that the digital output can be suitably compared with the analog input. The disclosure of that article is incorporated herein in its entirety by reference.

A typical analog to digital converter 81 which may be employed in this invention includes the ICL 7109 analog to digital converter manufactured and sold by Intersil, Inc. as described in *Electronics*, Aug. 17, 1978, in particular page 130.

The analog output system 80 has the capability of providing a voltage signal between two limits, for example, in the range from about 0 to about 5 volts to control devices such as to operate speed control device 24 to position a valve to activate an alarm or to drive a strip chart recorder (not shown). The interface unit 78 converts an output command generated by the arithmetic and control unit 72 (which is in binary form) into an output analog voltage signal by means of a digital to analog converter 83.

In a typical digital to analog converter 83, the digital signal is converted into analog form by associating each bit in the digital signal with a reference voltage. The resulting voltages are then summed in a voltage adder, the output of which is a resulting analog signal.

Typical digital to analog converters 83 which may be employed in the process of this invention include those digital to analog converters employed in industrial control systems at the point where a low level digital control system is converted to a high power signal code to control a motor or another kind of actuator in the process control scheme. Such typical digital to analog converters is described in detail in *Scientific American*, supra.

A teletypewriter 88 associated with the arithmetic and control unit 72 permits an operator to interact with the program and select the portions of the program stored as read only memory 76 to be addressed and the measured parameters of the system to be obtained.

In an embodiment of this invention, entries in the keyboard of teletypewriter 88 are comprised of operative command entries and numerical data entries, both hereafter termed "keyboard interrupts". Entry is accomplished by electrically connecting a binary code producing unit to read-write memory 74 of automatic control unit 70. Typically, binary code producing unit is a teletypewriter 88 which has a keyboard with numerical and alphanumerical keys thereon capable of being depressed. Preferably, the binary code producing unit is capable of producing a code such as a binary code in response to depressing of singular select keys of the keyboard.

A preferred keyboard for use on teletypewriter 88 is the ASCII keyboard, which is designed to represent the characters of the alphabet and numerical entries as bit patterns in binary code that the computer can understand. The ASCII code is described in detail in *Microprocessors and Microcomputers* by Branko Soucek, and in *Introduction to Programming*, Digital Equipment Corporation, Maynard, Mass., 1969. The disclosures of both publications are incorporated herein in their entirety by reference.

In operation, the code producing unit is electrically connected to arithmetic and control unit 72 and to read-write memory 74 and read only memory 76.

To enter an operative command such as start pump 4, the operator depresses a key on the keyboard. A code is produced by the teletypewriter in response to the depressing of a key. Subroutine X described later is called upon a depressing of a key on teletypewriter unit 88, and thereafter proceeds with a series of logic decisions. If such logic decisions are satisfactory, the arithmetic and control unit 72 directs the code to the designated location depending on whether the code was an operative command or a numerical data entry.

The arithmetic and control unit employs logic stored as read only memory 76 to carry out an operative command. Arithemtic and control unit 72 stores the value of numerical data in read-write memory 74. After the operative command is completed or the numerical data is entered, the read only memory 76 logic is employed to describe the completed action to the operator by action of the teletypewriter unit 88.

Alarm 90 is directly connected to arithmetic and control unit 72. Other display units can be coupled to the arithmetic and control unit 72. For example, display units may include light emitting diode type, liquid crystal display, gas discharge type electronic display, printing terminals, video display terminals, and the like.

The value stored in registers of read-write memory 74 for the controller generated interface voltage is dependent on the results of certain logic decisions made in execution of the program which are in turn dependent on whether the program is in (1) automatic control mode, (2) process change control mode, or (3) mode of fixed value.

First, in the automatic control mode, the program generates incremental voltage, $\Delta V$, based on a difference, D, between a desired rate of mass flow, $S_a$, and an actual rate of mass flow, S, adds $\Delta V$ to the controller generated interface voltage, V, to obtain a resultant voltage, $V_r$, which is stored as the controller generated interface voltage in registers of read-write memory 76.

Secondly, in the process change control mode, the program generates an operating voltage, $V_a$, in response to a new desired rate of mass flow, $S_b$. This operating voltage, $V_a$, is stored as controller generated interface voltage in registers of read-write memory 76.

Thirdly, in the control mode of fixed value, the stored value of controller generated interface voltage is fixed, generally at the value of the incremental operating voltage, $V_r$, generated during automatic control mode, or at an operating voltage, $V_a$, generating during process change control mode, or at an initial operating voltage, V, entered during startup of the program in the initialization step.

In control mode of fixed value, the voltage signal supplied to said mass mover is preferably maintained at the present value of voltage supplied to mass mover at the time the automatic control unit was switched to control mode of fixed value. In the mode of fixed value, the value of said operating voltage supplied to said control device may be nonzero.

During the automatic control mode, the program has the novel capability to switch the mode of fixed value providing certain logic decision steps so dictate. During the process change control mode, the program has the novel capability to (1) switch from process change control mode to automatic control mode or to (2) switch from process change control mode to mode of fixed value.

The program hereafter described distinguishes between and maintains an updated record of the particular control mode employed by the automatic control unit by means of values stored for internal directives such as flags in the read-write memory 76.

Referring to FIG. 3, the program of automatic control unit 70 begins with step 100 as the electric power is turned on to automatic control unit 70, speed control device 24, and pump 4. Steps 100 to 108 describe program logic employed only during an initial start of the computer program or a restart or reset of the computer program. From step 100, the program proceeds to step 102. In step 102, the program executes a self-diagnostic test involving (1) entering and retrieving of all data from read-write memory 74, (2) all instructions of arithmetic and control unit 72, (3) check all data stored in read only memory 76, and (4) check operability of electrical links to the interface unit 78. If the self-diagnostic test of step 102 is satisfactory, the program then proceeds to step 106. If, however, the self-diagnostic test of step 102 is unsatisfactory, the program will proceed to stop execution step 104.

In step 106, the program checks whether both the three-way mixing head valve 14 is at the proper position to pour (e.g., by checking electric supply to the electrical solenoid thereon) and also if electric power is available to mixing head motor 17. If the answer to both questions is "yes", then the program will remain in step 106 and continue to check both locations for operation since the computer should not be initialized during a pour and control should not begin during a pour. If, however, a pour is not in progress, that is, the three-way mixing head valve 14 is closed and/or the mixing head motor 17 does not have electric power supply, then the program proceeds to step 108 where the computer read-write memory 74 is initialized, that is, the read-write memory 74 receives predetermined (or default) calibration values for meters and desired rate of mass flow, $S_a$, from previous satisfactory pours.

In initialization 108 step, the variable array sizes for data are defined and some of the variables (to be more particulary described hereafter) are initialized to default starting values. Initializations include entering standard signal, $S_a$, representative of the desired rate of mass flow in the conduit; entering a rate of mass flow deviation range, $K_1-K_2$; entering standard process variable measurement range, $N_1-N_2$; entering in said automatic control unit a standard signal, $T_1$, representative of another process variable in said conduit and a standard deviation range, $G_1-G_2$, for said $T_1$; entering an initial operating voltage, V, transferable to the speed control device 24, as controller generated interface voltage; entering a second standard process variable measurement range, $M_1-M_2$, values for R and X, hereafter defined, code values stored in first, second, and third assemblages, hereafter described, values for alterable directives, hereafter described, calibration factors, and meter conversion factors and all other numbers necessary for utilizing and implementing of the process of this invention.

The initialization step starts the frequency counter cards 79 of the interface unit 78 which are used to measure rates of mass flow and permit interrupts by the keyboard of teletypewriter 88 or operating events. In the absence of data remaining in read-write memory 74 from a previous run, new initial values are stored in the read-write memory 74. When all of the required data has been initialized in step 108, the program proceeds to step 110—enable teletypewriter 88 and event driven interrupts. The computer program spends most of its time in steps 110-134 as it continues to monitor itself, the process and the process inputs.

In normal operation, the computer system is left electrically turned on so that startup of the foam line, for example, starting pump 4, will typically begin at or after step 110. Steps 110-134 are referred to hereafter as the "main monitor loop".

The portions of the program hereafter described relate to program logic employed after steps 100 to 108 are complete, e.g., the computer self-test is satisfactory and complete and the initialization step is complete.

As discussed previously, event driven interrupts cause the program to branch from the main monitor loop to appropriate subroutines described in detail later. Upon completing the action in the appropriate subroutine, the program returns to the main monitor loop at step 110, denoted by reference A of FIGS. 3-13.

After step 110, the program beings with main monitor loop portion by proceeding to step 116 where a diagnostic check is performed on the frequency counter cards 79 of interface unit 78. Step 116 checks to be sure that the frequency counter cards 79 are working. A frequency counter card 79 is considered working when there is pulse count or data interrupt generated every preselected time interval of X seconds.

If a frequency counter card 79 has stopped working, the program proceeds to step 118 where the program switches to control mode of fixed value and maintains the controller generated interface voltage for that particular process stream at its previous value. The program reports to the operator that the frequency counter cards has stopped working. From step 120, the program proceeds to step 110 to continue monitoring process changes.

If the frequency counter cards 79 diagnostic check of step 116 is satisfactory, the monitor program in a preferred embodiment proceeds to step 122 to check pressure sensor 46 to be sure that there is no high pressure in the process lines at the discharge of pump 4. The program receives signal, $N_0$, representative of actual process pressure in the discharge process line 10, for example, from pressure sensor 46. The program compares $N_0$ with the previously entered standard process variable measurement range, $N_1-N_2$. In step 122, if the pressure, $N_0$, is outside the range, $N_1-N_2$, which indicates high or low pressure in the process line, the program proceeds to step 120 where this information is conveyed in digital form from the automatic control unit 70 to the operator by use of teletypewriter 88. In following step 120, the controller generated interface voltage remains fixed at its last value until the process variable measurement is again within permissible process variable deviation range, $N_1-N_2$. From step 120, the program proceeds back to step 110 to monitor nondirected process changes.

In a preferred embodiment, the automatic control unit may report a deviation of for example high pressure on pump discharge to the operator for only the first time that the deviation occurs. The automatic control unit will proceed to the next logic step on the following cycle.

In a similar fashion, the automatic control unit 70, checks the pressure sensor 48 at three-way mixing range $N_1-N_2$ at three-way mixing valve 14, then the program proceeds to step 128 to check for changes in the output of tachometer-generator 30, otherwise it proceeds to step 120.

If step 128 indicates a tachometer-generator outside the desired range of $M_1-M_2$, the program proceeds to step 120 where this information is relayed to the operator by means of teletypewriter 88.

The automatic control unit 70 proceeds to step 134 and transmits the controller generated interface voltage V to control device 24 whereby the actual rate of mass flow $S_1$ is controlled closer to the desired rate of mass flow $S_a$.

Subroutine B shown in FIGS. 4 and 4A is an event driven interrupt in the form of data input from the process whereby data is entered in the form of pulse counts from frequency counter cards 79 to buffer unit (not shown) in read-write memory 74, the pulse counts are converted to mass units and employed thereafter in program logic to determine controller generated interface voltage values. In more detail, entry of data is accomplished by obtaining a first electrical signal, $S_1$, proportional to the actual rate of mass flow in said conduit in step 236 and obtaining a signal $T_2$ representative of another process variable in said conduit at a point in or on said conduit other than where $S_1$ is obtained in step 237, and conveying $S_1$ to said automatic control unit, in step 237, to frequency counter cards 79 in interface unit 78 and conveying $T_2$ to automatic control unit in step 238. As previously discussed, the pulse count from the frequency counter cards 79 is transmitted to the buffer unit (not shown) in read-write memory 74 in step 239, every preselected time interval X. Whenever this data interrupt occurs, a signal is sent to step 110 of FIG. 3 and step 110 of the monitor loop to step 240 of Subroutine B in FIG. 4.

In step 240, the program checks to see if this particular data indicates that a previously failed frequency counter card 79 has restarted working. If so, the program proceeds to step 242 where this information is transmitted to the operator via the teletypewriter 88. Subroutine B then branches from step 242 to the main monitor loop since the program cannot yet resume control of this stream.

If a frequency counter card has not failed, e.g., it is still working, then the program in Subroutine B proceeds from step 240 to step 244 where a rate of mass flow is calculated from the data input of the frequency counter cards 79. The pulse count from frequency counter card 79 is multiplied by an appropriate conversion factor entered in the automatic control unit 70 during initialization, to convert pulse counts to mass units.

The program then checks to see in step 246 whether the mass should be totalized for a selected time interval. Two process conditions dictate whether the mass should be totalized. They are; (1) is a pour in progress and, (2) is a calibration check being performed on a particular flow meter. If there is an affirmative answer to either (1) or (2), then the program in step 247 will calculate a totalized mass for that particular stream over a time period and sum this to a memory register for that stream in read-write memory 74.

If a totalized weight is not required in step 246, the program is evaluated in step 248 to determine if the automatic control unit is in automatic control mode. In the event the automatic control unit is in automatic control mode, the automatic control unit in step 250 compares the $S_a$ with $S_1$ in the automatic control unit and calculates a difference, D, between $S_a$ and $S_1$ and compares the difference, D, with the mass flow deviation range, $K_1-K_2$.

When the difference, D, exceeds the mass flow deviation range, $K_1-K_2$, in an embodiment (not shown in FIG. 4), the automatic control unit is switched to a mode of fixed value, and thereafter a signal proportional to the initial operating voltage, V, is transmitted to the control device to operate the mass mover at a fixed signal value.

In step 269, when said difference, D, is found to be a number within said mass flow deviation range, $K_1-K_2$, said automatic control unit, while in automatic control mode, calculates a voltage increment signal, $\Delta V$, proportional to the value of said difference, D, adds said $\Delta V$ to said V to obtain a resulting voltage, $V_r$, and transmits a signal proportional to said $V_r$ to said control unit as a new operating voltage, whereby said attenuated power supply to said mass mover is adjusted to provide a rate of mass flow closer to said $S_1$.

While said automatic control unit is in automatic control mode, after a predetermined time interval, X, a second signal, $S_2$ is obtained, said $S_2$ is proportional to the actual rate of mass flow in said conduit, and said signal, $S_2$, is conveyed to said automatic control unit, upon receipt of said second signal, $S_2$, by said automatic control unit, step 250 is repeated. Thereafter, step 269 or the automatic control unit is switched to a mode of fixed value.

As shown in FIG. 4, when said difference, D, exceeds said mass flow deviation range, $K_1-K_2$, in step 250, then comparing $T_2$ with $T_1$ to obtain a difference G, comparing G with said deviation range $G_1-G_2$ in step 253 and thereafter determining whether said mass mover is controlled by a mode selected from the group consisting of an automatic control mode and a mode of fixed value.

In particular, when such comparison in step 253 shows that G is within the range, $G_1-G_2$, the automatic control unit switches to a mode of fixed value in step 254 and thereafter transmits a signal proportional to the initial operating voltage, V, to said mass mover at a fixed position.

However, when the comparison in step 253 shows that G is outside the range, $G_1-G_2$, in step 269, the automatic control unit is controlled by automatic control mode, calculates a voltage increment signal, $\Delta V$, proportional to the value of said difference, D, $\Delta V$ is added to said V to obtain a resulting voltage, $V_r$, and a signal proportional to said $V_r$ is transmitted to said control unit as a new operating voltage, whereby the attenuated power supply to the mass mover is adjusted to provide a rate of mass flow closer to said $S_1$.

In the event that, at step 108 or otherwise, a change in the desired rate of mass flow is desired, a second standard signal, $S_b$, is entered in the automatic control unit 70, the automatic control unit is switched to process change control mode and a real time measurement is begun. An adjusted operating voltage $V_a$ is calculated according to the formula:

$$V_a = V_r \times \frac{S_b}{S_a}$$

the value of $V_a$ is stored as the controller generated interface voltage and is transmitted to the speed control device to operate the mass mover at a rate of mass flow closer to $S_b$.

Periodic data is also received from frequency counter cards 79 during the time the program is in process change control mode. A third electrical signal, $S_3$, proportional to the actual rate of mass flow in the conduit at a time interval, X, later than the second electrical signal, $S_2$, is obtained and is compared with $S_b$ to generate a third difference, $D_3$.

In step 271 the program determines if the system is in process change control mode. If it is not, the program returns to the monitor loop at point A of FIG. 3. If the automatic control unit is in process change control mode, the program proceeds to step 272, where a third difference, $D_3$ is compared with the mass deviation range, $K_1$-$K_2$. When the third difference, $D_3$, is found to be within mass deviation range, $K_1$-$K_2$, the program switches to automatic control mode in step 274 and returns to main monitor loop at point A of FIG. 3.

In the event the third difference, $D_3$, exceeds the mass deviation range, $K_1$-$K_2$, in step 272 after a predetermined time interval, $t_o+X$, a fourth electrical signal, $S_4$, later in time than electrical signal, $S_3$, is obtained which is proportional to actual rate of mass flow.

Fourth electrical signal, $S_4$ is compared with the second desired rate of mass flow, $S_b$, to generate a fourth difference, $D_4$. The fourth difference, $D_4$, is then compared with deviation range $K_1$-$K_2$ in step 272.

In the event $D_4$ is outside said mass flow deviation range, $K_1$-$K_2$, repeating steps 271, 272, and 276 as successive signals representative of actual flow are obtained, for R times in increments of X seconds, where R is in the range from about 1 to about 100, and where X is in the range from about 1 to about 100 seconds.

In the event said fourth difference, $D_4$, is within said mass flow deviation range, $K_1$-$K_2$, in step 272, switching said automatic control unit to said automatic control mode, and repeating steps 269 and 270.

In the event said difference, $D_4$, during the time up to about $t_0+$about R X seconds in step 276 does not fall within said mass flow deviation range, $K_1$-$K_2$, then switching said automatic control unit to mode of fixed value in step 278 and transmitting a signal proportional to said $V_a$ to the speed control device, and removing the value of $S_b$ from the automatic control unit.

Those of skill in the art will recognize that the values entered for $K_1$-$K_2$, $G_1$-$G_2$, $N_1$-$N_2$, $M_1$-$M_2$, R, V, X, $S_a$, $S_b$, and $T_1$ and the like, may be changed at appropriate times by keyboard interrupt. Values selected for $K_1$-$K_2$, $G_1$-$G_2$, $N_1$-$N_2$, $M_1$-$M_2$, $S_a$, $S_b$, $T_1$, R, X, V, all other variables, and the like, include all reasonable real numbers.

In subroutine C of FIG. 5, an internal clock keeps track of the actual time when an event occurs. When an event occurs, in step 450, the program determines if a report to the operator is required in step 449. If a periodic report is not required, subroutine C branches to step 110 of the main monitor program. If, however, the program requires a periodic report, the program interrupt feature proceeds to step 452 and prints a periodic report for the operator by use of teletypwriter 88. The program of subroutine C then returns to step 110 of the main monitor program. The computer is programmed to print specific records at the time significant events occurred. The time of day is printed so that sequence of events can be reconstructed later as needed. When the teletypewriter is idle, the computer program prints out periodic reports of the status of all streams where flow rates are measured. During startups, the report shows the rate of mass flow for each stream and the percentage of the combined streams, as well as the status of switches and the selected control mode of the stream. This report can be generated on request by the operator for all streams or a specific stream. If the terminal is left unattended, the report for all streams is generated automatically about every 15 minutes, or other selected time interval. This feature provides information to the operator which cannot be easily obtained with conventional flow meter readouts.

Subroutine D of FIG. 6 is a keyboard interrupt event which may be employed to calibrate the pulse generating flow meter 12 for a typical process stream. Subroutine D is activated upon the operator pressing input data on teletypewriter 88 whereby the program sets proper flag words to allow keyboard interrupt subroutine X to accept valid and sequentially allowable commands or numerical data by the operator. Data from a calibration test is accepted automatically when it is started (operator opens diverter valve). The automatic control unit 70 proceeds to totalize the amount of material flowing through pulse generating flow meter 12 during the calibration time period. At the end of that time interval, automatic control unit 70 in step 402 requests an actual weight from the operator. Upon receipt of this numerical quantity from the operator, the program in step 404 will calculate a meter factor for both the totalized weight from the read-write memory 74 and will also supply the meter factor calculated on the basis of the operator's supplied actual weight. In step 406, the program will ask the operator if the new motor factor based on the actual weight is satisfactory. If the operator responds affirmatively, the program proceeds to step 408 whereby a new meter factor is stored in the read-write memory 74. This program then proceeds to step 110 of the main monitor program. If in step 406 the new meter factor is not satisfactory to the operator, the program retains the previous meter factor and proceeds to step 110 of the main monitor program.

Subroutine E comprises an event interrupt subroutine program which is activated by the change of position of electrical switches on either the machine or on the switches on the electrical motor 6 powering pump 4. Subroutine E is activated when a switch has been turned on and when a switch has been turned off.

Figure 7:
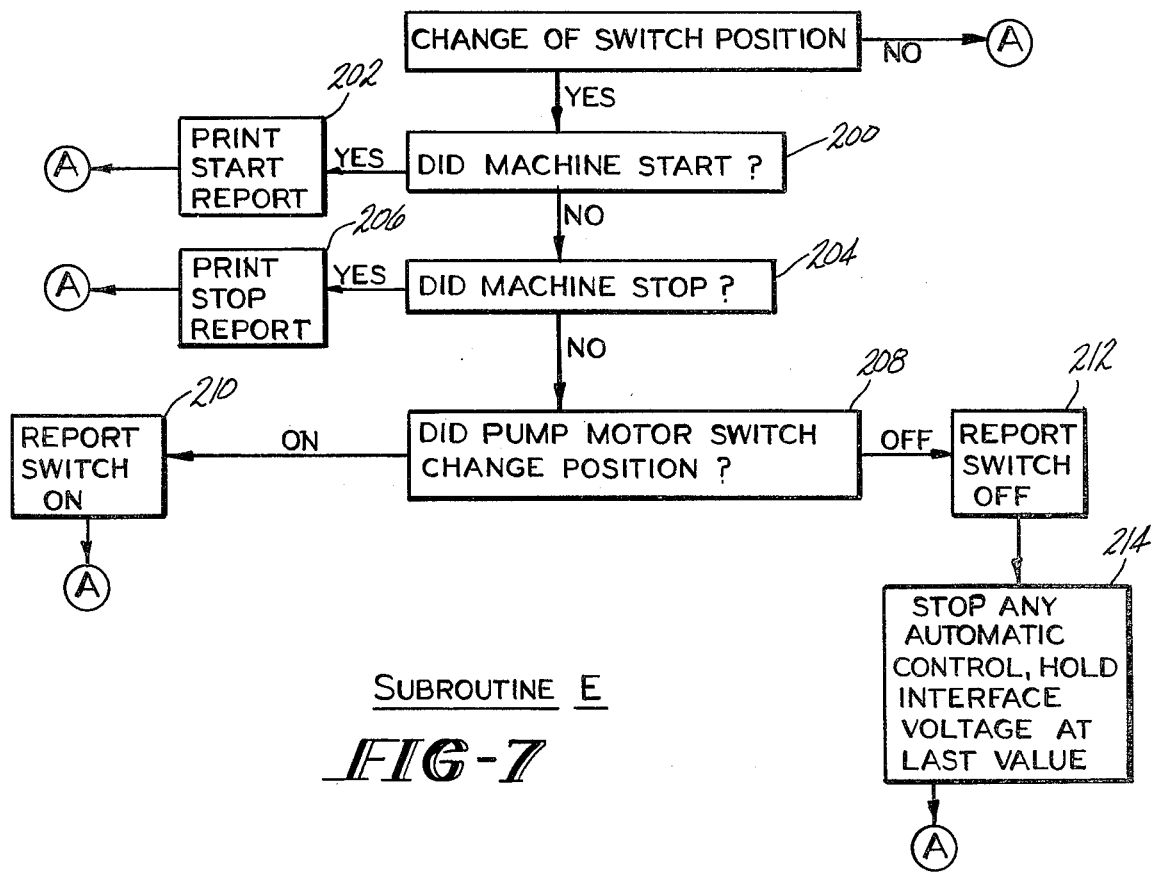

In particular, in subroutine E, depicted in FIG. 7, step 200 checks to see if the electric switch on the mixing head unit motor 17 was turned on. If so, the program proceeds to program step 202 whereby a start report is printed out from the computer to the teletypewriter 88. After step 202 of subroutine E, the program proceeds back to step 110 in the main program monitoring section.

If, however, mixing head unit motor 17 is not operating, the program of subroutine E proceeds to step 204 to see if the electric power has been turned off to the mixing head unit motor 17. If so, the program proceeds to step 206 where a stop report is printed out from the automatic control unit 70 to teletypewriter 88. Subroutine E then proceeds from step 206 to step 110 of the main monitoring program in FIG. 3.

If the switch has not been changed to the mixing head unit motor 17 in step 204, the program in subroutine E proceeds to step 208 to check to see if an electrical switch has been changed on the electric control and supply system to the electric motor 6 powering pump 4. If in step 208 an electrical switch in the system has been turned on, the program proceeds to step 210 where the automatic control unit 70 prints this change on teletypewriter 88. The program then returns to point A in the main monitor mode. If in step 208 a switch in the electric control and supply system to the electric motor 6 to pump 4 has been turned off, the program proceeds to step 212 and reports the particular switch has been turned off by the operator by means of the teletypewriter 88. The program then proceeds to terminate any automatic control by the program and the last controller generated interface voltage V is thereafter maintained at that particular output voltage it had as noted in the read-write memory 74 at the instance before that particular switch was moved to the off position. The program of subroutine E then returns to step 110 of the main monitor program.

Figure 8:
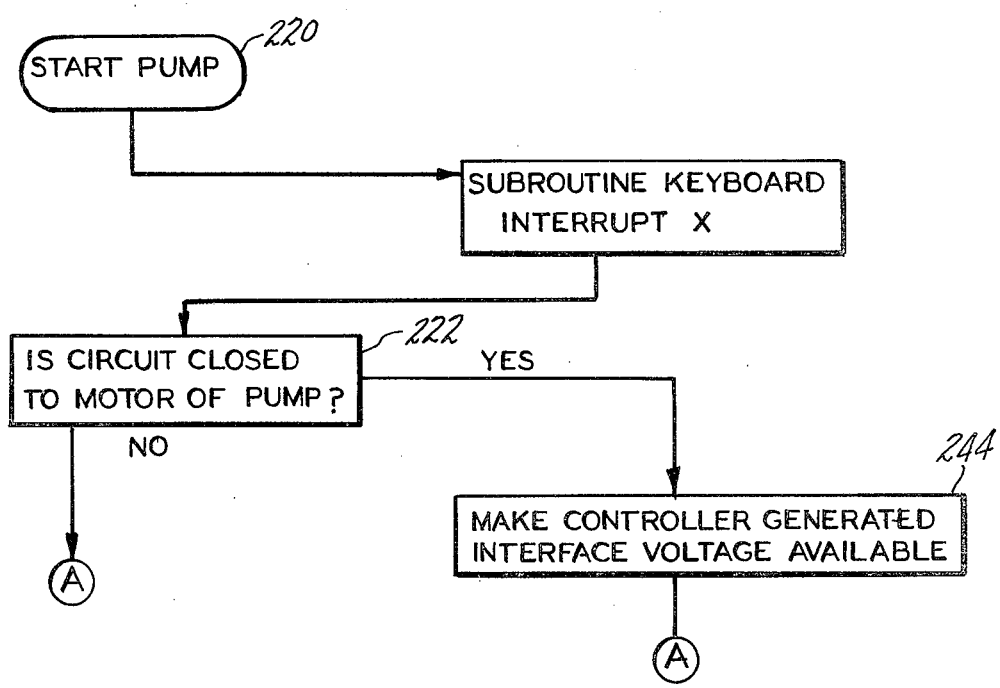

Start pump subroutine F of FIG. 8 is a keyboard interrupt event and comprises step 220 where the program branches to keyboard interrupt subroutine X to see if a valid and sequentially allowable command or numerical data has been entered. If the command or numerical data is satisfactory, then the program checks to see in step 222 if a closed electrical circuit exists to the electric motor 6, e.g., is electric motor 6 connected to the controller generated interface voltage? If so, in step 224, the program determines that a controller generated interface voltage should be conveyed to that motor and returns to step 110 of the main monitor program. However, if there is an open circuit to electric motor 6, then subroutine F instead returns to step 110 of the main monitor program since the pump cannot be started.

Figure 9:
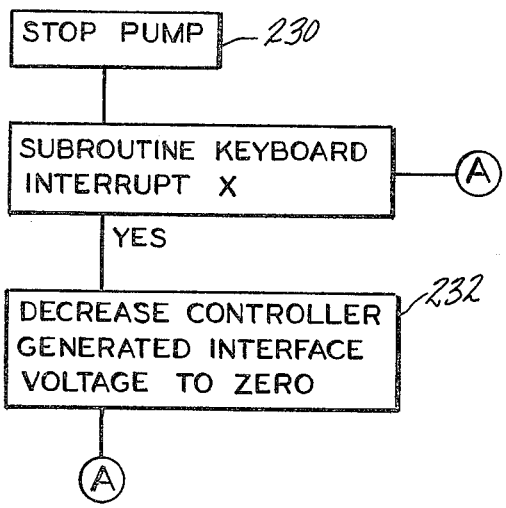

Stop pump subroutine G of FIG. 9 is a keyboard interrupt event which comprises step 230 where the program branches to keyboard interrupt subroutine X to see if a valid and sequentially allowable command or numerical data has been entered. If the command or numerical data is allowable, then in step 232, the program directs that the controller generated interface voltage should be set at 0. The program returns to step 110 of the main monitor program.

Subroutine H for starting automatic control is shown in FIG. 9, is a keyboard interrupt event which comprises step 240 whereby the program branches to keyboard interrupt subroutine X to see if a valid and sequentially allowable command or numerical data has been entered. If the data is okay, then the program moves to step 242, where it switches the automatic control unit to automatic control mode, whereby incremental voltage, V, is generated as described in steps 269 and 270 in response to actual rates of mass flow data, providing the difference, D, between actual rates of mass flow and standard, $S_a$, remains within a mass flow deviation range, $K_1$-$K_2$.

Figure 10:
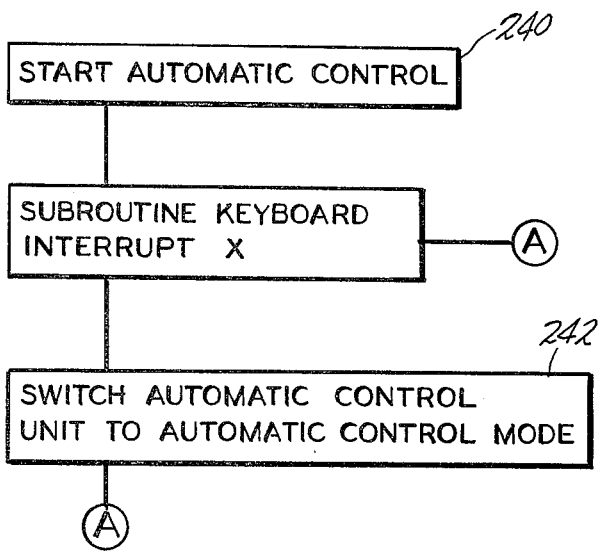
Figure 11:
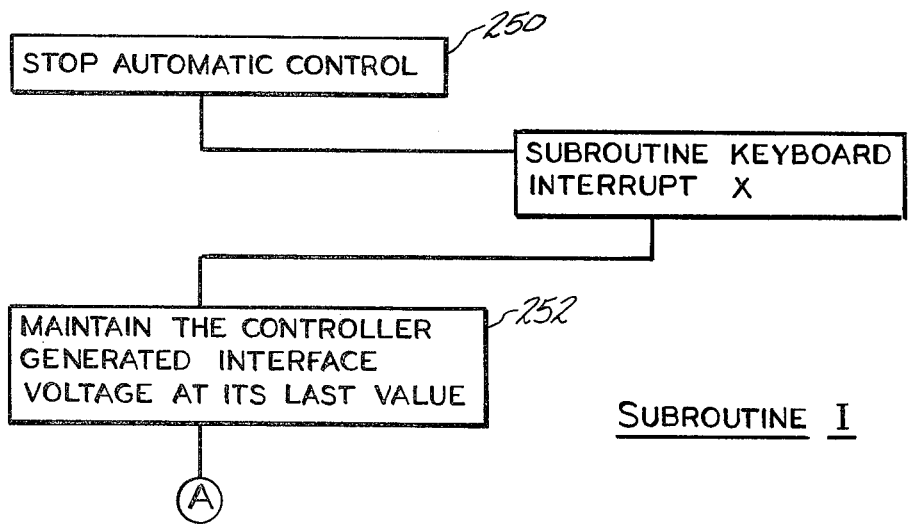

Subroutine I for stopping automatic control, as shown in FIG. 10, is a keyboard interrupt event which comprises step 250 whereby the program branches to keyboard interrupt subroutine X to see if a valid and sequentially allowable command or numerical data has been entered. If the command is satisfactory, then the program moves to step 252, where the value of the controller generated interface voltage is maintained at its last value, and fixes the value of the controller generated interface voltage. The program then returns to step 110 of the main monitor program.

Figure 12:
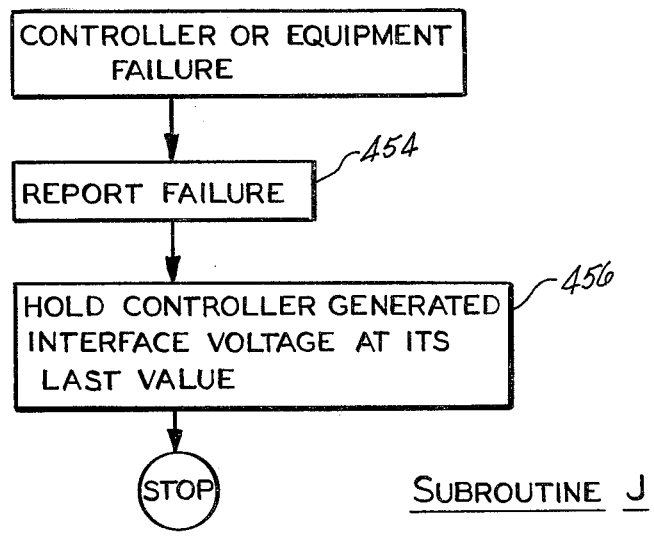

Event interrupt subroutine J shown in FIG. 12 monitors the microprocessor for an error, computer failure or equipment failure. Step 454 reports a failure of any one of these elements to the operator throught the teletypewriter unit. The program then proceeds to step 456 where all of the controller generated interface voltage are fixed at the value that it had the instant of time preceding the equipment failure. The program then proceeds to step 548 whereby execution of the program is terminated.

To keep time, an initial value is entered by keyboard interrupt subroutine X described in detial later and is stored in read-write memory 74. Thereafter, circuits operating from a stable time base such as the 60 Hz alternating current line frequency or a crystal controlled oscillator provide periodic clock signals of the value of which are continuously updated in read-write memory 74. The time subroutine (not shown) is programmed to event interrupt every minute.

Figure 13:
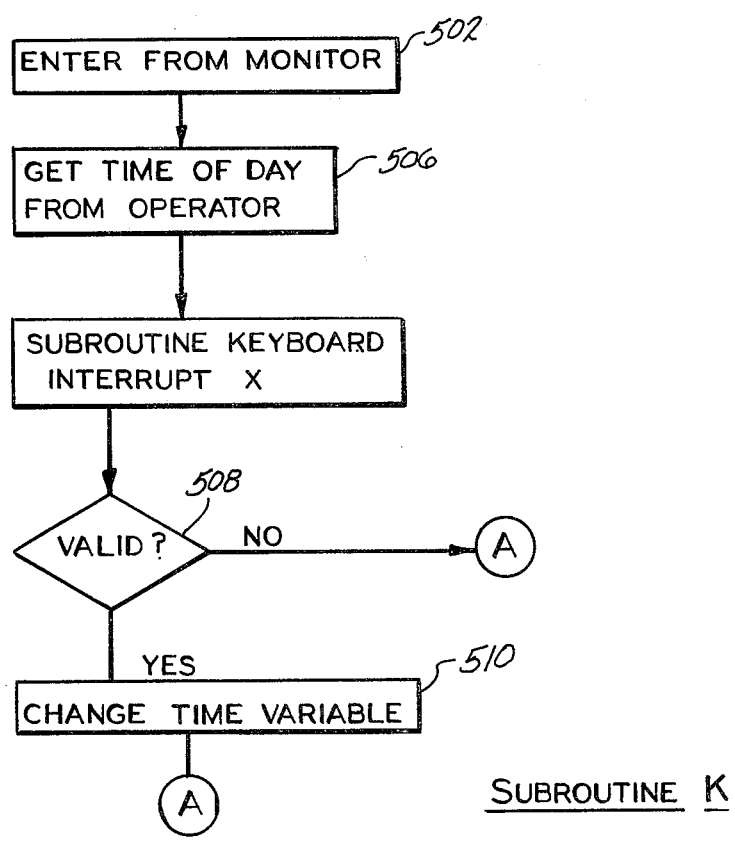

Keyboard interrupt subroutine K is used to reset the internal clock shown in FIG. 13 and is needed only when the microprocessor has been turned off, has been reset, or if there has been a real time change. Subroutine K is activated in step 502 by a command input from the operator by use of the teletypewriter 88. The program proceeds to step 506 where the operator enters the correct time. Upon receiving this information from the operator, the program of subroutine K branches to subroutine keyboard interrupt X to see if a valid and sequentially allowable command or numerical data has been entered. If valid, in step 508, the program stores the updated time in read-write memory 74 in step 510 and thereafter returns to step 110 of the main monitor program. If the entry is not valid in step 508, then the program returns to step 110 of the main monitor program.

Subroutine print report (not shown) comprises steps whereby the program branches to keyboard interrupt subroutine X to see if a valid and sequentially allowable command or numerical data has been entered. If the data is satisfactory, then the real time is printed out, along with the actual rate of mass flow for each component, the desired rate of mass flow for each component, a calculated percentage difference of actual to desired rate of mass flow, a code denoting whether a controller generated interface voltage signal is connected to the transfer pumps, a code denoting whether the controller generated interface voltage is operating in fixed value mode or whether it is in automatic control mode and a flow basis report whereby the percentage of each component of the total blend is calculated and printed. Also, a percentage "off" is calculated and printed which is the difference of the total blend concentration from an original desired concentration entered into read-write memory 74 during initialization step 108.

Keyboard interrupt subroutine List Status (not shown) prints out the same information as subroutine print report except only for the particular component selected.

If desired, a pump speed ramp up logic may be included as part of the read-write memory 74 in step 134 wherein the controller generated interface voltage is incrementally increased or "ramped up" over a selected time interval, I. The ramp up function operates in cooperation with interface unit 78 producing the controller generated interface voltage so that a control voltage is added to the output of the interface supply. During several time cycles of operation, the output of the interface and hence the output voltage at the controller generated interface voltage is gradually increased stepwise from an initial value to a final desired value, the rate of increase determined by a ramp up rate. The ramp up logic is employed only when the controller generated interface voltage is desired to be increased to the particular motor to fully control the rate of increase in pump speed and corresponding increase in flow of a particular stream.

The particular ramp up rate is preferably linear with time. Typically, the initial voltage is increased linearly from, for example, about 0 to a final voltage of about 5 volts, during a preselected time, I, in the range from about 0.05 to about 10,000 and preferably from about 10 to about 120 seconds. Greater or lesser elapsed times may be employed. The ramp up rate is independent of initial or final voltage. After step 134, the program returns to step 110.

Keyboard interrupts in the form of operative commands and numerical data by the action of depressing keys on the keyboard are accomplished in several embodiments which are described hereafter. In a first embodiment, the entry of an operative command from the keyboard is accomplished by depressing a single key comprising the steps of (a) depressing a select singular key on the keyboard of a binary code producing unit thereby producing a single unit of binary code corresponding to the depressed key, (b) transmitting the singular unit of binary code to read-write memory 74, and (c) employing the singular unit of the binary code to represent a more complex operative command in the program logic, which is printed for the operator on the terminal as if he had typed the more complex command.

In a second embodiment, only certain predetermined entries are permitted to be entered to read-write memory 74. This is accomplished by maintaining in read-write memory 74 an assemblage of select binary code values wherein the assemblage comprises binary code values corresponding to predetermined acceptable entries to read-write memory 74. In a third embodiment, the first and second embodiments may be employed simultaneously to permit the entry of complex operative commands from the keyboard by depressing a single key as well as permitting only the entry of allowable commands and numerical data. In a fourth embodiment, only sequentially allowable entries are permitted to be to read-write memory 74, which is accomplished by the use of internal flags. In a fifth embodiment, the first and third embodiments may be employed together. In a sixth embodiment, the second and third embodiments may be employed together.

Keyboard interrupts in the form of operative commands and numerical data by the action of depressing a single key as well as allowing only acceptable operative commands and numerical data is accomplished by preferred improved method which comprises:

(a) depressing a select key on the keyboard of the code producing unit thereby producing a singular unit of unique code corresponding to the depressed key, (b) transmitting the unique code to memory unit, (c) maintaining in memory unit a first assemblage of acceptable code values from among all values of the code, wherein the first assemblage comprises binary code values corresponding to predetermined acceptable entries to read-write memory 74, (d) further employing the singular unit of binary code when singular unit of said binary code is contained within said first assemblage, (e) maintaining in read-write memory 74 a second assemblage and a third assemblage of select singular code values chosen from among first assemblage code values wherein:

(1) codes of said third assemblage are exclusive of codes in said second assemblage and comprise predetermined acceptable data entries, and (2) codes of said third assemblage are exclusive of codes in said first assemblage and comprise predetermined acceptable operative command entries, (f) further employing said singular unit of said binary code as a data entry when said single unit of said binary code is contained within said second assemblage, or (g) further employing the singular unit of the binary code as an operative command when the singular unit of the binary code is contained within the third assemblages.

After an entry then the program is arranged so that only certain types of keyboard entries may be sequentially allowable. Consequently, if an unacceptable entry is made on the keyboard, it is regarded as spurious and is ignored.

The process of this invention may employ a keyboard subroutine X in combination with the aforementioned steps comprising a series of logic statements which (a) enable the program to ignore spurious keys depressed on teletypewriter 88, (b) enable the program to act only on operative commands or numerical keys which are logically sequential, and (c) permit entry of an operative command by action of a single depressed key on teletypewriter 88. Subroutine X as shown in FIG. 13 illustrates the keyboard interrupt logic for the preferred sixth embodiment. This logic is programmed to accept only certain numerical, alphanumerical or combinations thereof from the teletypewriter keyboard which are contained as a first assemblage in read-write memory 74. Not necessarily all of the characters or combinations thereof from teletypewriter 88 may be allowable entries in subroutine X. However, those characters which are allowable are further divided into N numbers of assemblages of keys which categorize the type of key depressed. N is an integer in the range from 1 to about 10. Preferably, N is 3 and the allowable keys are divided into two groups, a command type key group, or first assemblage and a numerical entry type key group, or second assemblage.

The acceptance of commands and numerical entries which are logically sequential is accomplished by means of internal flags. The value of flags are set and updated after entry of an allowable command or numerical data and thereafter stored in registers. Typically, after a valid command has been entered, the value of the internal flag is reset immediately by the program stored in read only memory 76 to allow only a numerical entry as the next piece of information. The value of the internal flag corresponding to that valid command is a code so that only a select group of data may be sequentially followed as allowable data.

Figure 14:
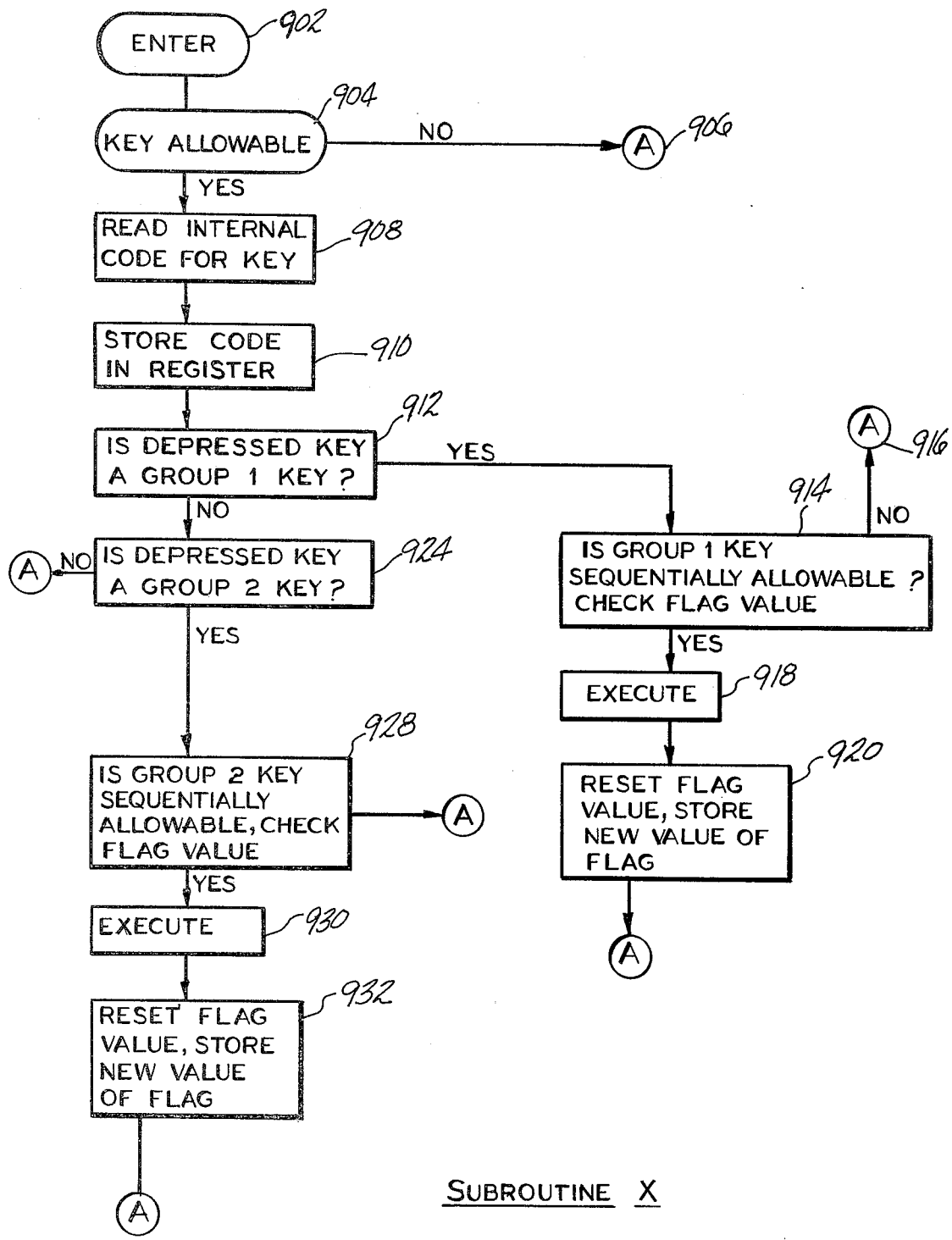

In particular, FIG. 14 depicts a preferred embodiment of the above-described basic logic employed in subroutine X.

Subroutine keyboard interrupt X is initiated in step 902 by the action of the service operator in depressing a key on the teletypewriter 88. In step 904, the program of subroutine keyboard interrupt X checks the depressed key to see if this is an allowed key from among all groups of keys allowable. If the depressed key is not an allowed key, then the program proceeds to step 906 where the program treats the depressed key as a spurious key, ignores it and returns to step 110 of the main monitor loop.

However, if the depressed key is an allowable key, then the program proceeds to step 908 to read the internal program code corresponding to that depressed key from read-write memory 74. The preferred internal program code, ASCII, is a series of numbers corresponding to the keys of the teletypewriter 88 and is described in detail in "How to Program Microcomputers" by William Barden, Jr., Howard W. Sams & Co., 1977, in particular Chapter 4, pages 9-41, the disclosure of which is incorporated herein by reference in its entirety.

In step 910, the program stores the value of the internal computer code corresponding to the key depressed in registers of read-write memory 74. The program then proceeds to step 912 where the depressed key is now checked to determine what type of key it is, for example, whether it is a numerical key or a command key. In the particular embodiment illustrated in FIG. 14, group I keys are command keys and group II keys are numerical keys. In FIG. 3, the program checks in step 912 to see if the depressed key is a command key. If so, the program then proceeds to step 914 to see if a command key is sequentially allowable, that is, is the program expecting a command key to be depressed? The program then proceeds to check the value of a flag. If the value of a flag indicates that only a numerical key is sequentially allowable and the key is a command key, then the program proceeds to step 916 where the program ignores the depressed key and returns to step 110 of the main monitor loop.

If, however, a command key is sequentially allowable, then the program will branch to a location indicated by the value of the internal program code corresponding to the depressed key. For example, the key may correspond to step 918 where the program executes a particular command corresponding to the depressed key, for example, start pump. In step 920, the value of the flag will be reset to accept as a next key only a numerical key. The next key which is entered must be a numerical key which indicates the desired value of the set point or standard value for that pump. The program then exits to step 110 of the main monitor loop.

If the depressed key is not a group I key in step 912, the program proceeds to step 924 to determine if the depressed key is a group II key, a numerical entry key. If the key is not a group II key, the program proceeds to see if the depressed key is a group N key in step 926. If the key is not a member of any group, the program exits to step 110 of the main monitor loop.

If, however, the key is a group II key (that is a numerical key), the program proceeds to step 928 to see if a group II key is sequentially allowable by checking the value of a flag. If the value of the flag is satisfactory, the program accepts the value of the numerical entry key and executes the command in step 930. The value for the flag is then reset and the value therefore is stored in register storage in step 932. The program returns to step 110 of the main monitor program.

If the value of the flag in step 928 indicates that a group II key is not sequentially allowable, then the program returns to step 110 of the main monitor loop in step 934.

For example, with reference to FIG. 4, when the mass being controlled is a polyol, and the pump is a gear pump, and the control device is a motor speed control device, $S_a$, may be selected as 500 pounds per minute, $S_1$ may be a signal of about 3 volts proportional to an actual rate of mass flow of polyol of about 550 pounds polyol per minute, $K_1-K_2$ may be about $\pm 5\%$ of $S_a$, $T_1$ may be about 2,000 pounds per minute as the pump rotational speed, $G_1-G_2$ may be about $\pm 5\%$ of $T_1$, $T_2$ may be about 3,000 pounds per minute as the pump rotational speed, $N_0$ may be about a 2 millivolt signal proportional to a pressure of about 30 pounds per square inch and $N_1-N_2$ may be about $\pm 5\%$ of 30 pounds per square inch. Any reasonable number may be employed with reference to FIG. 3. $S_b$ may be about 600 pounds per minute. Those of skill in the art will recognize how to control the rate of mass flow of polyol closer to the desired rate of mass flow by employing the method and/or apparatus of this invention.

In a preferred embodiment, a proportional plus reset control function algorithm may be employed to calculate the incremental voltage, $\Delta V$. Integral action is reset to zero if the flow error crosses zero error. This incremental voltage, $\Delta V$, may be calculated by means of the following control function algorithm (1):

$$V = C_1 D + C_2 \sum_{i=1}^{i=\infty} \frac{D_{-i}}{2^i} \quad (1)$$

where $C_1$ is a proportional gain value, a numerical constant in the range from about 0.5 to about 5, where $C_2$ is an integral gain value-a numerical constant in the range from about 0 to about 1, where D is the difference at the present time, and $D_{-i}$ is the difference at the previous measurement time period in which the stream was in automatic control mode, and where D is as defined previously and wherein i is an integer counter which is increased by 1 every time a $\Delta V$ is calculated.

Another application for the process of this invention includes in line blending operations to prepare other curable polyurethane compositions such as reaction injection molding compositions typically comprised of an "A" side and a "B" side. The "A" side typically comprises organic isocyanate while the "B" side typically comprises polyol, catalysts, chain extending agents and mixtures thereof.

Although preferred embodiments of the invention have been described in detail, it is to be understood that various changes, substitutions and alterations can be made therein without departing from the spirit and scope of the invention as defined by the appended claims.

What is claimed is:

1. An improved method for automatically controlling the rate of mass flow in a system having a mass mover powered by a power supply which is attenuated by a control device for transferring mass through a conduit, wherein a signal proportional to said mass flow is transmitted to an automatic control unit, characterized by the improvement which comprises, in combination;
   (a) entering in said automatic control unit a standard signal, $S_a$, representative of a desired rate of mass flow in said conduit,
   (b) entering in said automatic control unit a rate of mass flow deviation range, $K_1-K_2$,
   (c) entering in said automatic control unit an initial operating voltage, V, and transferring a signal proportional to said V to said control device to operate said mass mover while in automatic control mode to attenuate said power supply to said mass mover, and to produce a rate of mass flow in said conduit at said initial operating voltage, V, (d) obtaining a first signal, $S_1$, proportional to the actual rate of mass flow in said conduit, and conveying said first signal, $S_1$, to said automatic control unit, (e) comparing said $S_a$ with said $S_1$ in said automatic control unit and calculating a difference, D, between said $S_a$ and said $S_1$, and comparing said difference, D, with said mass flow deviation range, $K_1$-$K_2$, (f) when said difference, D, exceeds said mass flow deviation range, $K_1$-$K_2$, switching said automatic control unit to a mode of fixed value, and thereafter transmitting a signal proportional to said initial operating voltage, V, to said control device to operate said mass mover at a fixed signal value.

2. The method of claim 1, characterized by the further improved step in which, (g) when said difference, D, is found to be a number within said mass flow deviation range, $K_1$-$K_2$, while said automatic control unit is in automatic control mode, calculating a voltage increment signal, $\Delta V$, proportional to the value of said difference, D, adding said $\Delta V$ to said V to obtain a resulting voltage, $V_r$, and transmitting a signal proportional to said $V_r$ to said control unit as a new operating voltage, whereby said attenuated power supply to said mass mover is adjusted to provide a rate of mass flow closer to said $S_1$.

3. The method of claim 2, characterized by the further improved step in which, (h) while said automatic control unit is in automatic control mode, after a predetermined time interval, X, obtaining a second signal, $S_2$, which is proportional to the actual rate of mass flow in said conduit, conveying said signal, $S_2$, to said automatic control unit, repeating step (e) upon receipt of said second signal, $S_2$, by said automatic control unit, and thereafter repeating step (f) or step (g).

4. An improved method for automatically controlling the rate of mass flow in a system having a mass mover powered by a power supply which is attenuated by a control device for transferring mass through a conduit, wherein a signal proportional to said mass flow is transmitted to an automatic control unit, characterized by the improvement which comprises, in combination:

(a) entering in said automatic control unit a standard signal, $S_a$, representative of a desired rate of mass flow in said conduit, (b) entering in said automatic control unit a rate of mass flow deviation range, $K_1$-$K_2$, (c) entering in said automatic control unit an initial operating voltage, V, and transferring a signal proportional to said V to said control device to operate said mass mover under automatic control mode, to attenuate said power supply to said mass mover, and to produce a rate of mass flow in said conduit at said initial operating voltage, V, (d) entering in said automatic control unit a standard signal $T_1$ representative of another process variable in said conduit, S, and a standard deviation range, $G_1$-$G_2$, for said $T_1$, (e) obtaining a first signal, $S_1$, proportional to the actual rate of mass flow in said conduit, obtaining a signal corresponding to $T_2$ at a point in said conduit other than where said $S_1$ is obtained, and conveying said first signal, $S_1$, and said $T_2$ to said automatic control unit, (f) comparing said $S_a$ with said $S_1$ in said automatic control unit, and calculating a difference, D, between said $S_a$ and said $S_1$, and comparing said difference, D, with said mass flow deviation range, $K_1$-$K_2$, (g) when said difference, D, exceeds said mass flow deviation range, $K_1$-$K_2$, comparing $T_2$ with $T_1$ to obtain a difference G, comparing G with deviation range $G_1$-$G_2$, and thereafter determining whether said mass mover is controlled by a mode selected from the group consisting of an automatic control mode and a mode of fixed value.

5. The method of claim 4 wherein said comparison shows that G is within said range, $G_1$-$G_2$, switching said automatic control unit to a mode of fixed value, and thereafter transmitting a signal proportional to said initial operating voltage, V, to said control device to operate said mass mover at a fixed position.

6. The method of claim 4 wherein, when said comparison shows that said G is outside said range, $G_1$-$G_2$, while said automatic control unit is controlled by an automatic control mode, calculating a voltage increment signal, $\Delta V$, proportional to the value of said difference, D, adding $\Delta V$ to said V to obtain a resulting voltage, $V_r$, and transmitting a signal proportional to said $V_r$ to said control unit as a new operating voltage, whereby said attenuated power supply to said mass mover is adjusted to provide a rate of mass flow closer to said $S_1$.

7. The method of claim 6, characterized by the further improvement, after completion of step (g) or step (h), if said automatic control unit is in said automatic control mode, the steps comprising:

(i) entering in said automatic control unit a second standard signal, $S_b$, representative of the next desired rate of mass flow through said conduit, switching said automatic control unit to a process change control mode, and beginning a real time measurement, $t_o$, (j) calculating an adjusted operating voltage, $V_a$, according to the formula $$V_a = V \text{ (or } V_r) \times \frac{S_b}{S_a}$$

(k) transmitting a signal corresponding to said V to said speed control device, whereby said attenuated main electric supply voltage to said mass mover is adjusted to provide a rate of mass flow closer to said $S_b$, and (l) obtaining a third electrical signal, $S_3$, proportional to said rate of mass flow and comparing said third electrical signal, $S_3$, with said $S_b$, and obtaining a difference $D_3$, (m) comparing said difference, $D_3$, with said deviation range, $K_1$-$K_2$, (n) switching said automatic control unit to said automatic control mode and repeating steps (e) and (f) when said difference is within said mass flow deviation range, $K_1$-$K_2$.

8. The method of claim 7, characterized by the further improvement, (o) in the event said $D_3$ exceeds said mass flow deviation range, $K_1$-$K_2$, obtaining after a predetermined time interval, $t_o + X$, a fourth electrical signal, $S_4$, proportional to actual mass flow in said conduit, (p) comparing said fourth electrical signal, $S_4$, with said second standard signal, $S_b$, to obtain a fourth difference, $D_4$, (q) comparing said fourth difference, $D_4$, with said mass flow deviation range, $K_1-K_2$, (r) in the event $D_4$ is outside said mass flow deviation range, $K_1-K_2$, repeating steps (o), (p), and (q) for R times in increments of X seconds, where R a number is in the range from about 1 to about 100, and where X is in the range from about 1 to about 100 seconds, (s) in the event said fourth difference, $D_4$, is within said mass flow deviation range, $K_1-K_2$, switching said automatic control unit to a mode of fixed value, and repeating steps (e) and (f), (t) in the event said difference, $D_4$, during the time up to about $t_o + R\ X$ seconds does not fall within said mass flow deviation range, $K_1-K_2$, then switching said automatic control unit to said mode of fixed value and transmitting a signal proportional to said $V_r$ to said speed control device, and (u) removing the value of said $S_b$ from said automatic control unit.

9. The method of claim 3 or 8 wherein said automatic control unit receives signals from frequency counter cards, and the system is switched to mode of fixed value when no signal is received from said frequency counter cards during a predetermined period of time X.

10. The method of claim 9 wherein said power supply is an electric power supply.

11. The method of claim 10 wherein said control device is a speed control device.

12. The method of claim 11 wherein said automatic control unit is selected from a group consisting of a computer, minicomputer, microcomputer, and microprocessor.

13. The process of claim 12 wherein said computer is comprised of an arithmetic and control unit, a read only memory, a read-write memory, and a code producing device.

14. The method of claim 13 wherein said code producing device is a teletypewriter, and said automatic control unit is a microprocessor.

15. The method of claim 14 which further comprises
(a) supplying a separate electrical power supply to said microprocessor and said interface unit, and
(b) transmitting a fixed voltage from said interface unit to said speed control device upon loss of said electric power supply to said microprocessor.

16. The method of claim 15 which further comprises
(a) transmitting a fixed voltage from said interface unit to said speed control device upon receipt by said interface unit of an electrical signal from said microprocessor representative of a mechanical failure of said microprocessor.

17. The method of claim 16 wherein said mass is a compound capable of forming a curable polyurethane foam composition selected from the group consisting of polyol, blowing agent, chain extending agent, water, catalyst, lubricant, organic isocyanate, fluorinated hydrocarbon, and mixtures thereof.

18. The method of claim 17 wherein said mass mover is a pump.

19. The method of claim 18 wherein said conduit is a pipe.

20. The method of claim 19 wherein said actual process variable measurement is temperature.

21. The method of claim 20 wherein said actual process variable measurement is pressure.

22. The method of claim 19 wherein said actual process variable measurement is mass flow.

23. In an apparatus for automatically controlling the rate of mass flow in a system having a mass mover powered by a power supply which is attenuated by a control device for transferring mass through a conduit, wherein a signal proportional to said mass flow is transmitted to an automatic control unit, characterized by the improvement which comprises in combination:

(a) an automatic control unit programmed with predetermined standard signals and signal ranges for mass flow, (b) means for entering in said automatic control unit a standard signal, $S_a$, representative of a desired rate of mass flow in said conduit, (c) means for entering in said automatic control unit a rate of mass flow deviation range, $K_1-K_2$, (d) means for enterining in said automatic control unit an initial operating voltage, V, and transferring a signal proportional to said V to said speed control device to operate said mass mover under automatic control mode, to attenuate said main electric power supply to said mass mover, and to produce a rate of mass flow in said conduit at said initial operating voltage, V, (e) means for obtaining a first electrical signal, $S_1$, proportional to the actual rate of mass flow in said conduit, and another electrical signal $TG_1$ proportional to a measurable process variable and independent of said $S_1$, and conveying said $TG_1$ and said $S_1$ to said automatic control unit, (f) means for comparing said $S_a$ with said $S_1$ in said automatic control unit, and calculating a difference, D, between said $S_a$ and said $S_1$, and comparing said difference, D, with said mass flow deviation range, $K_1-K_2$, and (g) when said difference, D, exceeds said mass flow deviation range, $K_1-K_2$, means for switching said automatic control unit to a mode of fixed value, and thereafter transmitting a signal proportional to said initial operating voltage, V, to said speed control device to operate said mass mover at a fixed signal value.

24. The apparatus of claim 23 wherein said automatic control unit is comprised of a computer, an interface unit, and a code producing unit.

25. The apparatus of claim 24 wherein said computer is a microprocessor, and said code producing unit is a teletypewriter.

26. The apparatus of claim 25 wherein a separate power supply is provided for said microprocessor and for said interface unit.

27. The apparatus of claim 26 wherein said mass mover is a pump.

28. The apparatus of claim 27 wherein said conduit is a pipe.

29. The apparatus of claim 28 wherein said power supply is electric.

30. The apparatus of claim 29 wherein said control device is a speed control device.

31. The method of claim 16 wherein said mass is a compound capable of forming a curable reaction injection molding composition or semi-liquid injection molding composition selected from the group consisting of polyol, blowing agent, chain extending agent, water, catalyst, lubricant, and organic isocyanate.

32. The method of claims 3 or 8, characterized by the improved step comprising incrementally increasing the controller generated interface voltage during a preselected time interval in the range from about 0.05 to about 10,000 seconds.

33. The method of claim 32 wherein said preselected time is in the range from about 10 to about 120 seconds.

34. The method of claim 32 wherein said controller generated interface voltage is increased linearly with time.

35. The method of claims 3 or 8 wherein in said control mode of fixed value, the voltage signal supplied to said mass mover is maintained at the present value of voltage supplied to said control device to operate said mass mover at the time said automatic control unit was operating said mass mover and was switched to said control mode of fixed value.

36. The method of claims 3 or 8 wherein a second mass mover is employed, and wherein said operating voltage signal is attenuated to only said second mass mover by said control device.

37. The method of claim 36 wherein said second mass mover is a flow control device.

38. The method of claims 3 or 8 wherein in said mode of fixed value, the voltage signal supplied to said control device to operate said mass mover is nonzero.

39. The method of claims 1 or 4, wherein said automatic control unit includes an arithmetic and control unit and there is a code producing unit electrically connected to said arithmetic and control unit and there is a memory unit electrically connected to and communicative with said automatic control unit, said code producing unit having a keyboard with singular keys, thereon capable of being depressed to produce a unique code, said arithmetic and control unit being capable of receiving and storing said unique code in said memory unit, said method characterized by the further step of entering sequentially allowable keyboard entries comprised of operative command entries and data entries from said code producing unit to said arithmetic and control unit, said step comprising:
(a) depressing a select key on said keyboard to produce a unique code corresponding to the depressed key,
(b) transmitting said unique code to said memory unit,
(c) maintaining in said memory unit a first assemblage of acceptable code values from among all values of said code, and
(d) comparing said unique code with said acceptable code values and determining whether said unique code is acceptable.

40. The method of claim 39, characterized by the further steps of:
(e) maintaining in said memory unit
(1) a second assemblage of acceptable codes corresponding to data on said keyboard, and
(2) a third assemblage of acceptable codes of corresponding operative command entries on said keyboard,
(f) determining if said unique code is acceptable in said second assemblage, and if so, entering said unique code into said memory unit as a numerical entry for further utilization, and
(g) if said unique code is not acceptable to said second assemblage and is acceptable to said third assemblage, then entering said unique code into said memory unit as a command entry for further utilization.

41. The process of claim 40 wherein said acceptable unique codes are directed by alterable directives in said memory unit and further utilized in said memory unit when it is sequentially allowable.

42. The process of claim 41 wherein said alterable directives are flags.

43. The method of claim 42 wherein said memory unit is read-write memory.

44. The method of claim 42 wherein said unique code is ASCII code.

45. The method of claim 42 wherein said code reading unit is a teletypewriter.

46. The method of claims 3 or 8, characterized by the further improvement of employing the improved method of claim 42.

47. The method of claims 39, 40, or 41 characterized by the further improved step which comprises:
(a) depressing a select singular key on said code producing unit thereby producing a single unit of code corresponding to the depressed key,
(b) transmitting said singular unit of code to said memory unit, and
(c) employing said singular unit of said binary code to represent an operative command in the program logic.

48. The method of claim 47 wherein said code is binary code.

49. The method of claim 48 wherein said operative command comprises supply interface voltage to pump.

* * * * *